US011520520B2

(12) United States Patent
Ishiguro

(10) Patent No.: US 11,520,520 B2
(45) Date of Patent: Dec. 6, 2022

(54) MEMORY SYSTEM AND METHOD OF CONTROLLING NONVOLATILE MEMORY

(71) Applicant: Kioxia Corporation, Tokyo (JP)

(72) Inventor: Takashi Ishiguro, Yokohama (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/446,875

(22) Filed: Sep. 3, 2021

(65) Prior Publication Data
US 2022/0188020 A1  Jun. 16, 2022

(30) Foreign Application Priority Data
Dec. 15, 2020  (JP) .............................. JP2020-207741

(51) Int. Cl.
*G06F 3/06* (2006.01)

(52) U.S. Cl.
CPC ............ *G06F 3/0656* (2013.01); *G06F 3/064* (2013.01); *G06F 3/0604* (2013.01); *G06F 3/0659* (2013.01); *G06F 3/0679* (2013.01)

(58) Field of Classification Search
CPC ...... G06F 3/0656; G06F 3/0604; G06F 3/064; G06F 3/0659; G06F 3/0679
See application file for complete search history.

(56) References Cited

U.S. PATENT DOCUMENTS

| 10,698,635 | B2 | 6/2020 | Jin |
| 11,137,920 | B1* | 10/2021 | Bert ........................ G06F 3/061 |
| 2020/0167274 | A1 | 5/2020 | Bahirat et al. |
| 2020/0257449 | A1 | 8/2020 | Frolikov |
| 2021/0223962 | A1* | 7/2021 | Esaka ..................... G06F 3/061 |
| 2021/0255803 | A1* | 8/2021 | Kanno .................. G06F 3/0656 |
| 2021/0263674 | A1* | 8/2021 | Shin ....................... G11C 16/10 |

* cited by examiner

*Primary Examiner* — Francisco A Grullon
(74) *Attorney, Agent, or Firm* — Oblon, McClelland, Maier & Neustadt, L.L.P.

(57) ABSTRACT

According to one embodiment, a controller receives from a host a first command for writing data sequentially to a first zone. When buffers include a first buffer to which the first zone is allocated, the controller stores the first data in the first buffer. When the buffers do not include the first buffer but include a free buffer, the controller allocates the first zone to a second buffer that is the free buffer and stores the first data in the second buffer. When the buffers include neither the first buffer nor a free buffer, the controller additionally allocates the first zone to a third buffer of which last update for storing data is the oldest among the buffers, and stores the first data in the third buffer to which the first zone is additionally allocated.

20 Claims, 18 Drawing Sheets

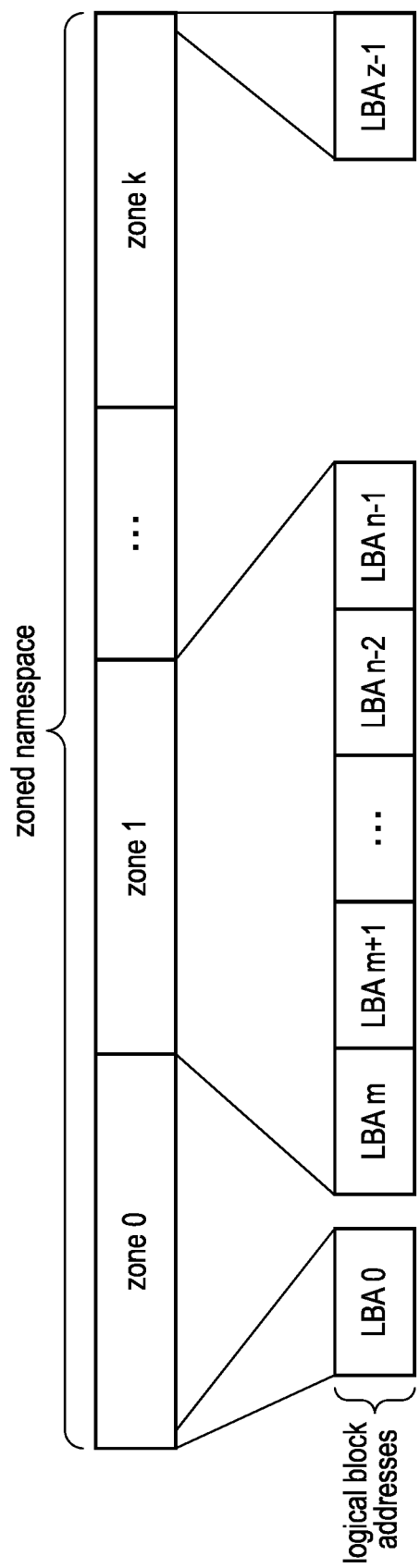
F I G. 2

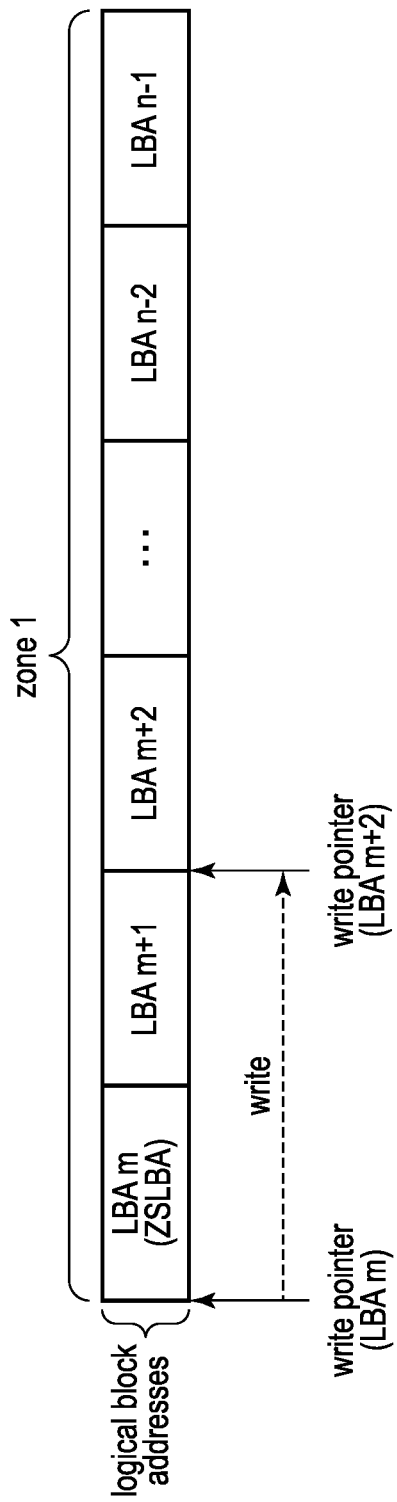
F I G. 3

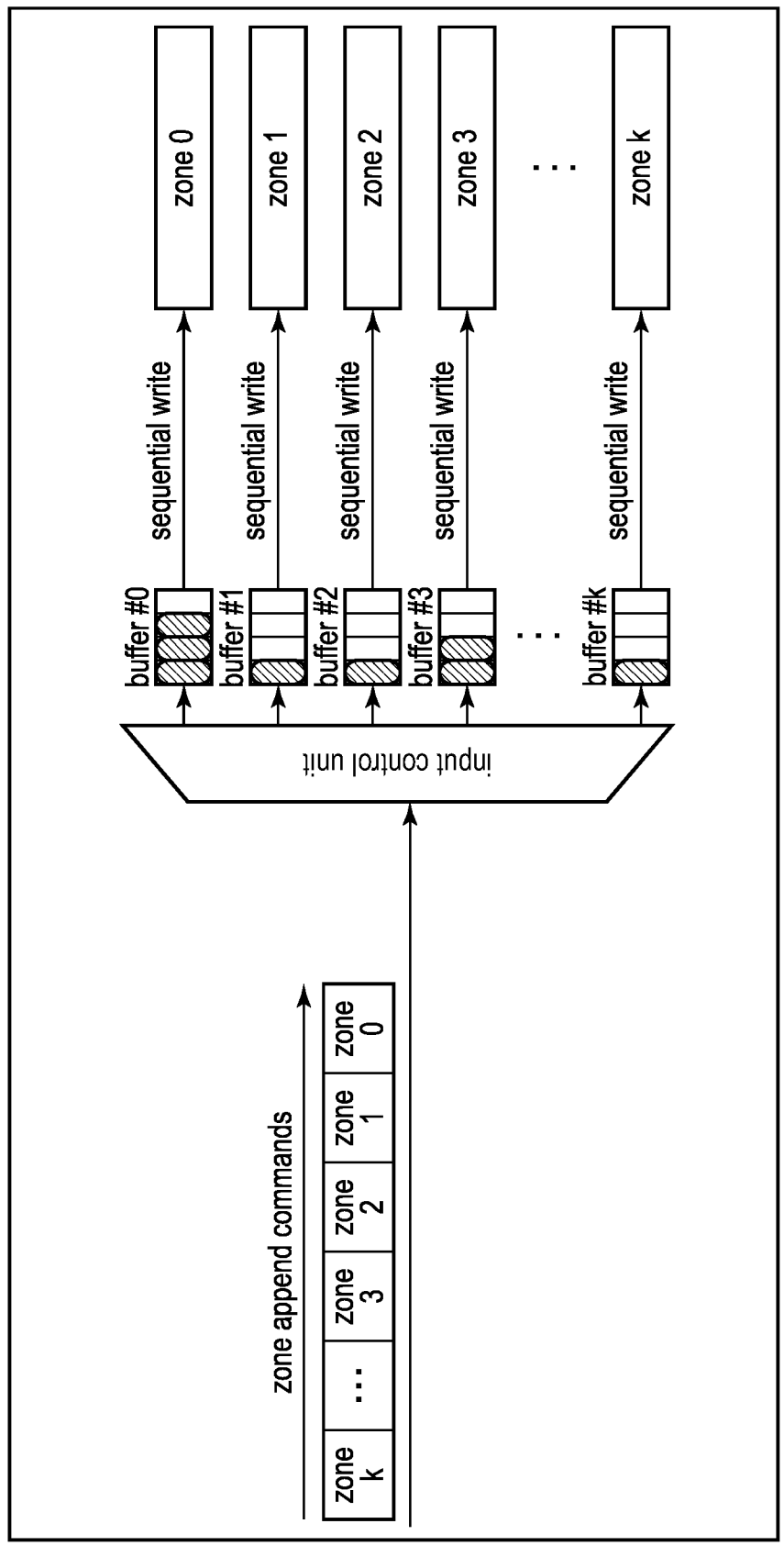
F I G. 4

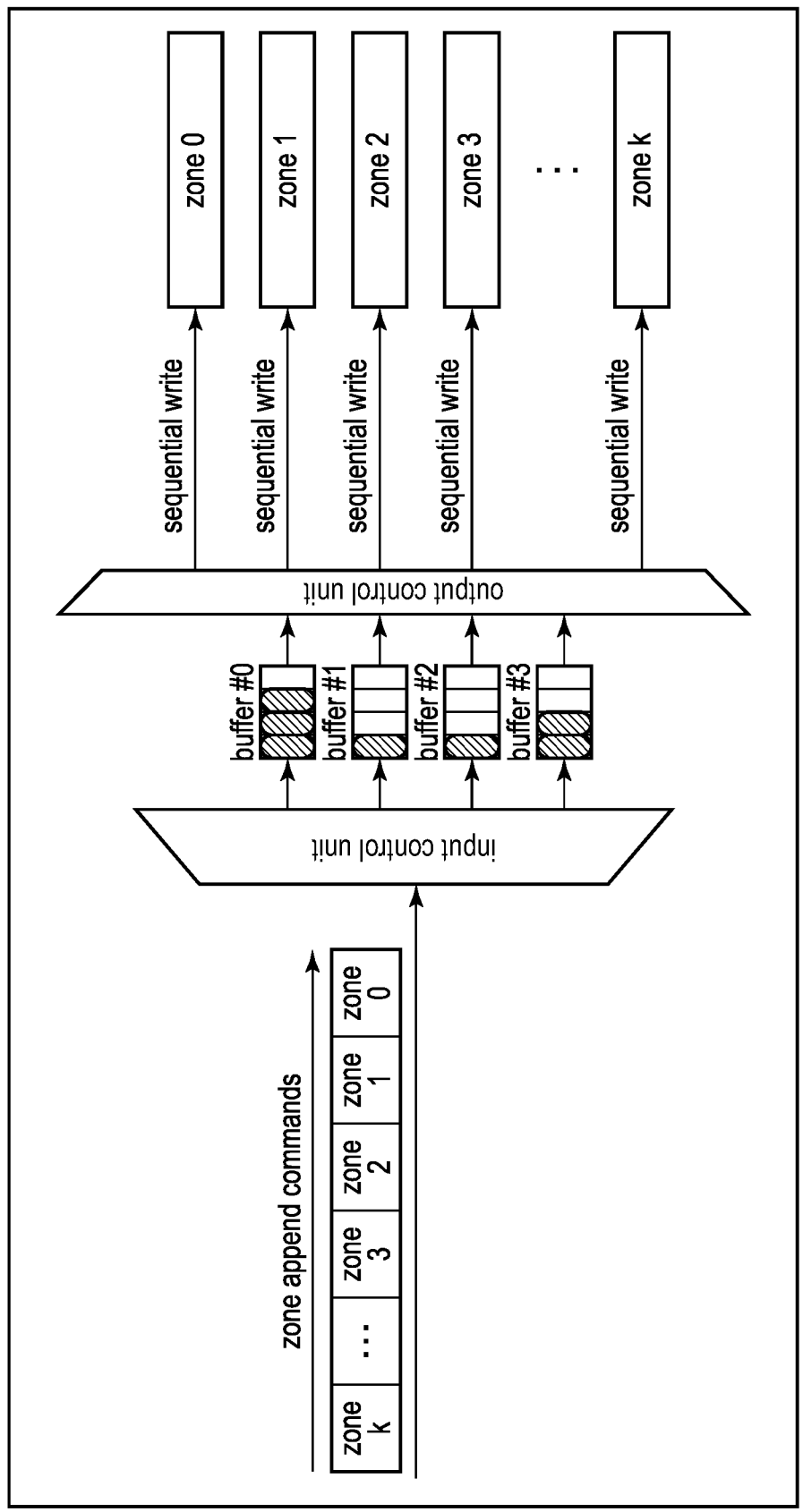
F I G. 5

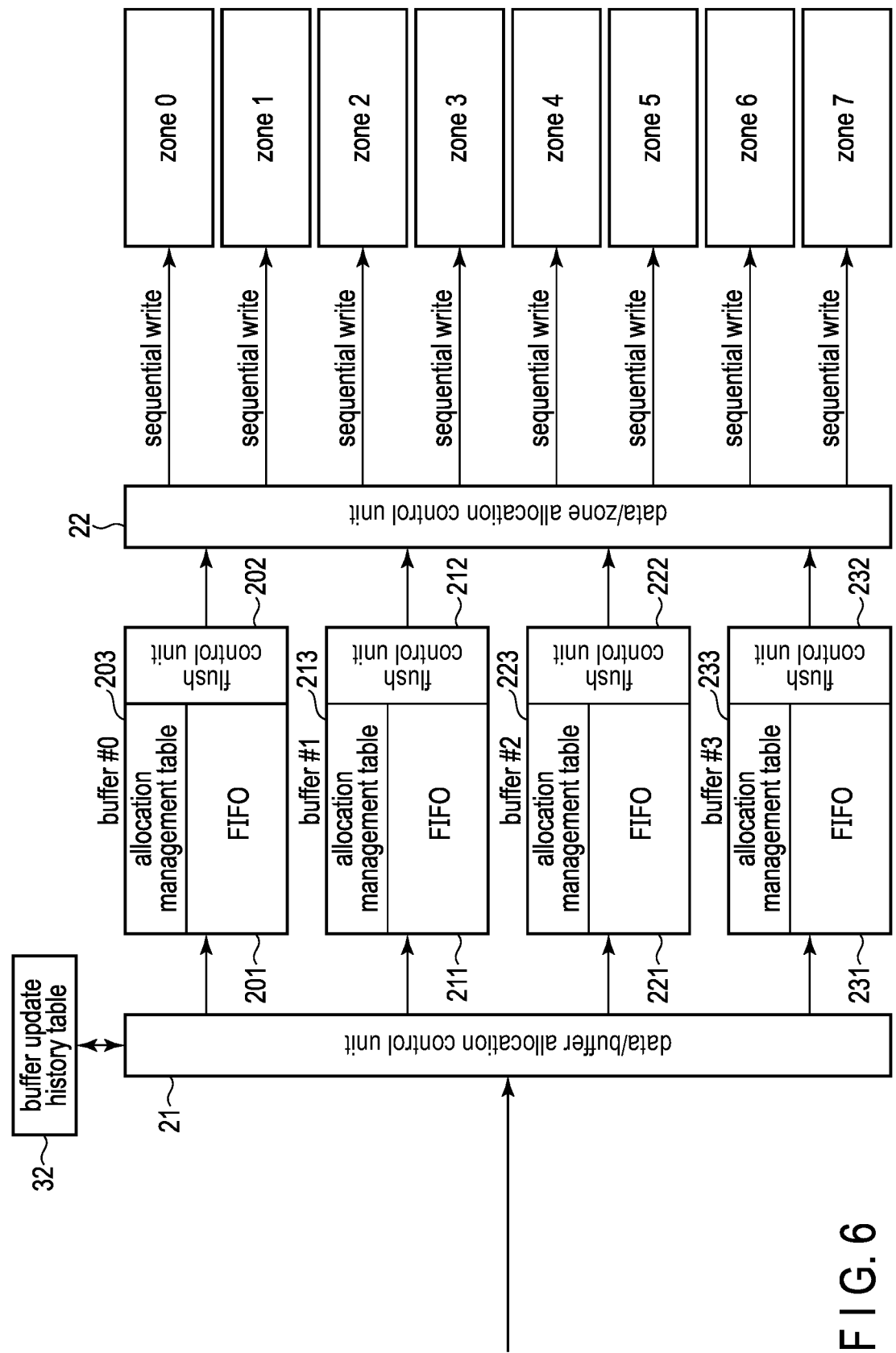
F I G. 6

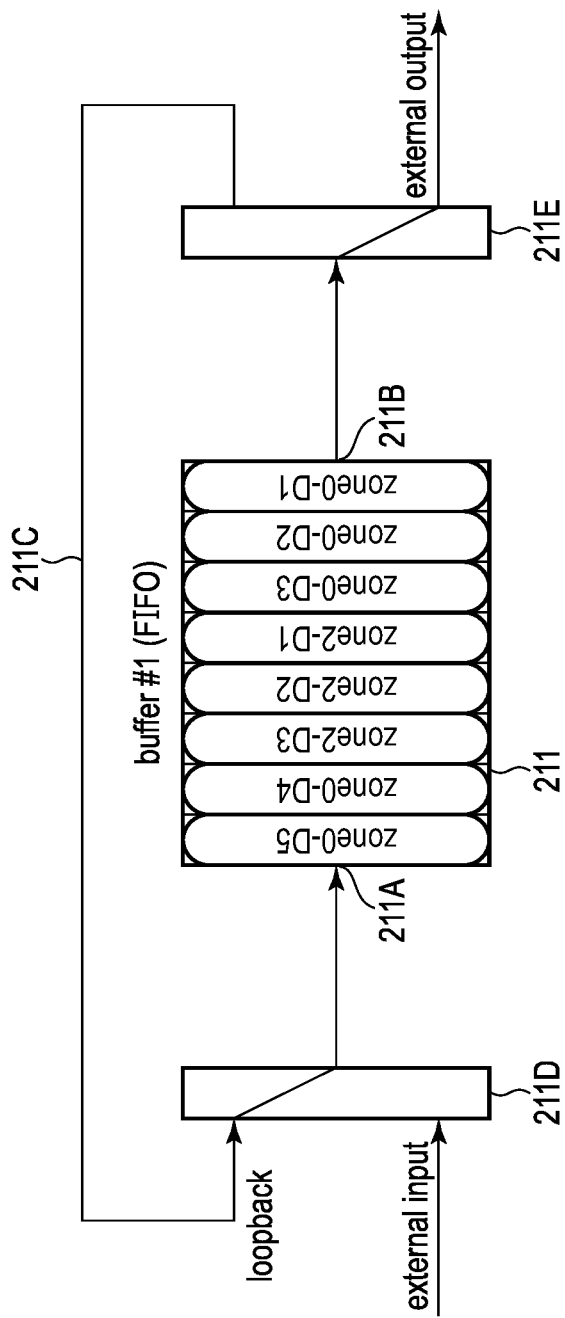
F I G. 8A

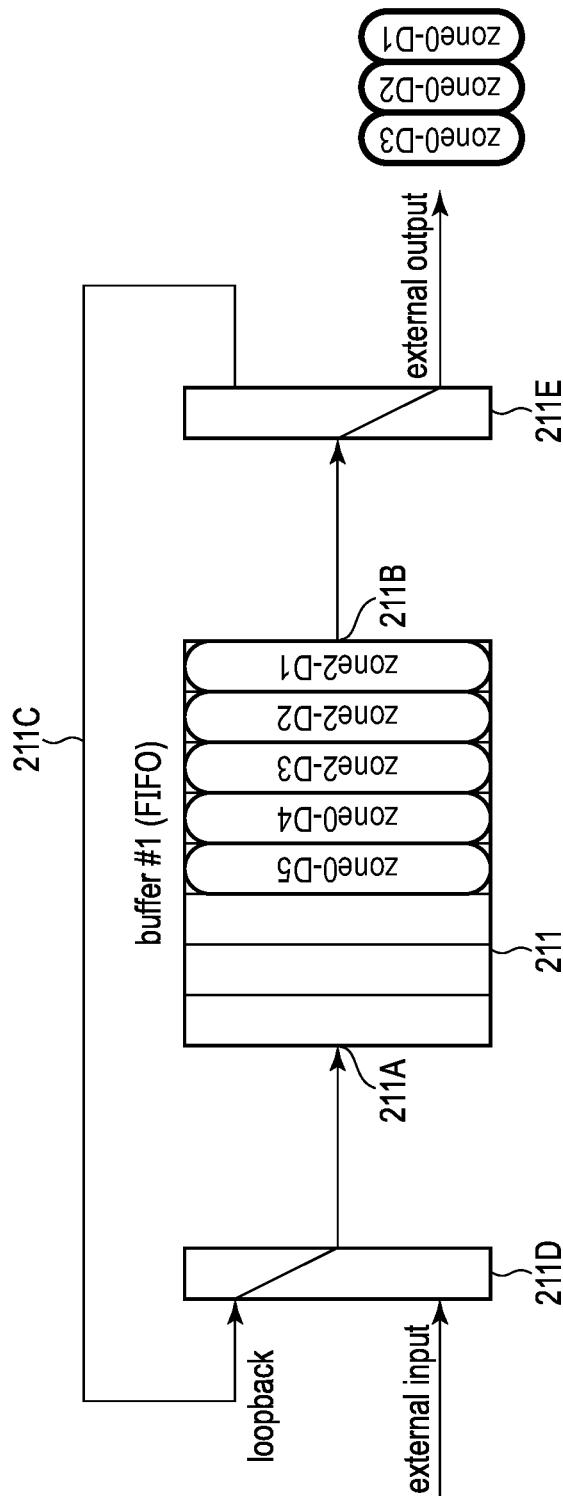
F I G. 8B

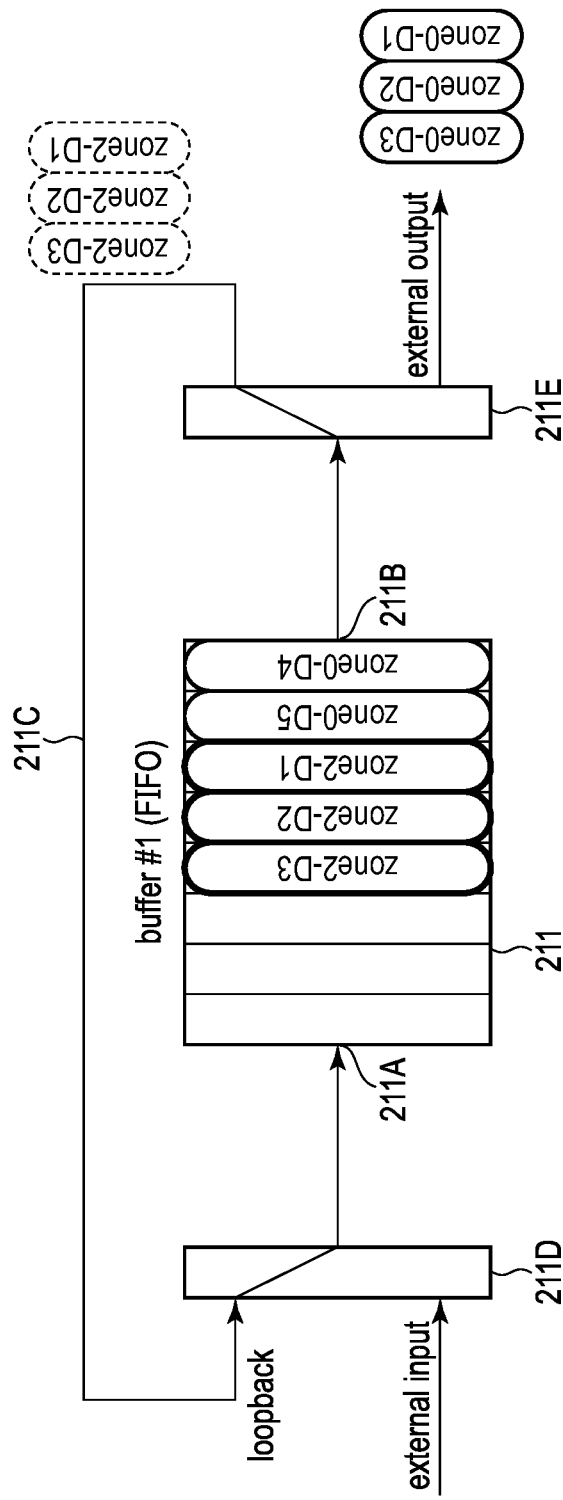
F I G. 8C

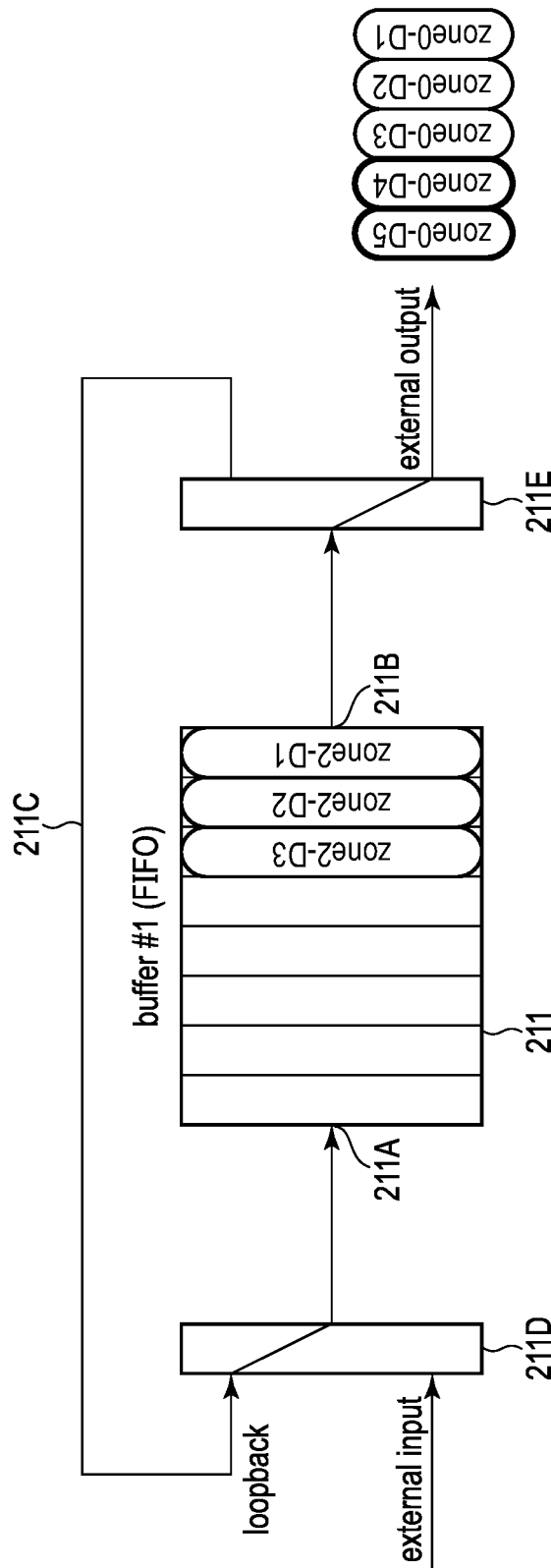
F I G. 8D

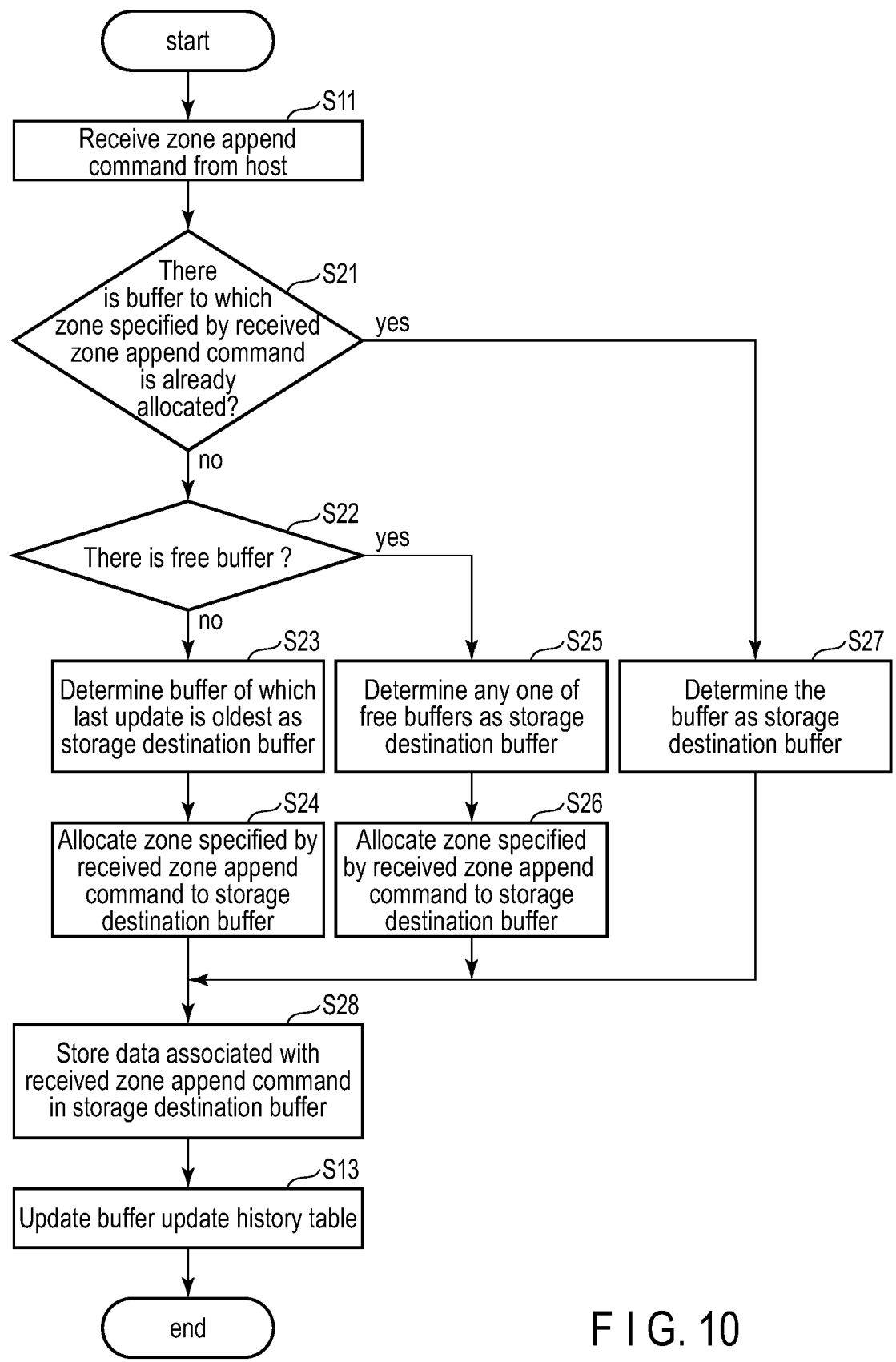
F I G. 10

MEMORY SYSTEM AND METHOD OF CONTROLLING NONVOLATILE MEMORY

CROSS-REFERENCE TO RELATED APPLICATIONS

This application is based upon and claims the benefit of priority from Japanese Patent Application No. 2020-207741, filed Dec. 15, 2020, the entire contents of which are incorporated herein by reference.

FIELD

Embodiments described herein relate generally to a technology of controlling a nonvolatile memory.

BACKGROUND

Memory systems implemented with a nonvolatile memory have recently become widespread. As such memory systems, a solid state drive (SSD) implemented with a NAND flash memory has been known.

As a standard for a logical interface for communication between a host and a memory system such as the SSD, NVM Express™ (NVMe™) is known. In the standard of NVMe, a zoned namespace is defined. In the zoned namespace, a logical address range of the memory system is divided into a plurality of zones.

In the memory system, the same number of buffers as that of zones may be prepared. The buffers may be used for buffering data that are to be written to different zones, zone by zone. If a large number of zones need to be managed in the memory system, a large amount of memory resources for the buffers are to be used for these zones.

Thus, in the memory system, it is required to implement a new technology capable of reducing the amount of necessary memory resources.

BRIEF DESCRIPTION OF THE DRAWINGS

FIG. 2 is a diagram illustrating an example of a configuration of a zoned namespace defined by a standard of NVMe.

FIG. 3 is a diagram illustrating an update operation of a write pointer, which is performed in the memory system according to the embodiment.

FIG. 4 is a diagram illustrating a buffering process to be performed in a memory system according to a comparative example.

FIG. 5 is a diagram illustrating another buffering process performed in the memory system according to the comparative example.

FIG. 6 is a diagram illustrating a buffering process performed in the memory system according to the embodiment.

FIG. 8A is a diagram illustrating a first process of an overtaking process performed in the memory system according to the embodiment.

FIG. 8B is a diagram illustrating a second process of the overtaking process performed in the memory system according to the embodiment.

FIG. 8C is a diagram illustrating a third process of the overtaking process performed in the memory system according to the embodiment.

FIG. 8D is a diagram illustrating a fourth process of the overtaking process performed in the memory system according to the embodiment.

FIG. 10 is a flowchart illustrating a procedure for a data/buffer allocation process performed in the memory system according to the embodiment.

DETAILED DESCRIPTION

Various embodiments will be described hereinafter with reference to the accompanying drawings.

In general, according to one embodiment, a memory system includes a nonvolatile memory, and a controller electrically connected to the nonvolatile memory. The controller is configured to control the nonvolatile memory using a zoned namespace defined by a standard of NVM express, the zoned namespace being divided into a plurality of zones. The controller manages a plurality of buffers. The number of the plurality of buffers is smaller than the number of the plurality of zones. In response to receiving from a host a first command for writing data sequentially to a first zone among the plurality of zones, the first command being associated with first data, the controller performs following process. When the plurality of buffers include a first buffer to which the first zone is allocated, the controller stores the first data in the first buffer. When the plurality of buffers do not include the first buffer but include a free buffer to which no zone is allocated, the controller allocates the first zone to a second buffer that is the free buffer and stores the first data in the second buffer to which the first zone is allocated. When the plurality of buffers include neither the first buffer nor a free buffer to which no zone is allocated, the controller additionally allocates the first zone to a third buffer of which last update for storing data is the oldest among the plurality of buffers, and stores the first data in the third buffer to which the first zone is additionally allocated.

Figure 1:
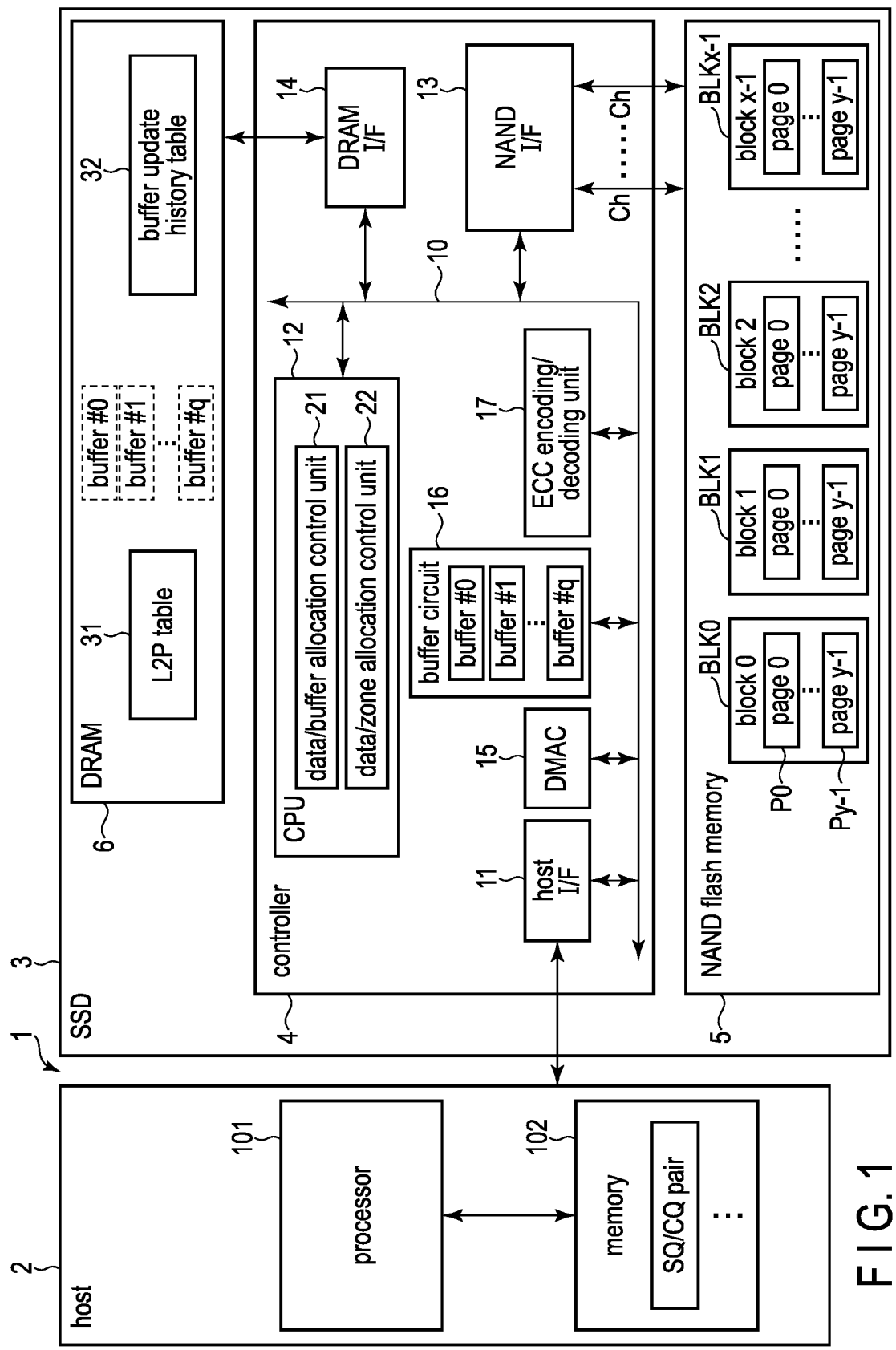
FIG. 1 is a block diagram illustrating an example of a configuration of an information processing system including a memory system according to an embodiment.

FIG. 1 is a block diagram illustrating an example of a configuration of an information processing system 1 including a memory system according to an embodiment. The information processing system 1 includes a host (host device) 2 and a memory system 3.

The memory system 3 is a semiconductor storage device configured to write data to a nonvolatile memory and read data therefrom. The memory system 3 may be implemented as an SSD 3 that includes a NAND flash memory 5.

The SSD 3 may be connected to the host 2 via a cable or a network. Alternatively, the SSD 3 may be built in the host 2. As a standard for a logical interface for connection between the host 2 and the SSD 3, a standard of NVMe can be used.

The host 2 is an information processing apparatus configured to control the SSD 3. The host 2 is, for example, a personal computer, a server computer, a mobile terminal, or in-vehicle equipment.

The host 2 includes a processor 101 and a memory 102. The processor 101 is a central processing unit (CPU) configured to control the operation of each component in the host 2. The processor 101 executes software (host software) which is loaded into the memory 102 from the SSD 3 or another storage device connected to the host 2. The host software includes an operating system, a file system, a device driver, an application program and the like.

The memory 102 is a main memory provided in the host 2. The memory 102 is implemented with a random-access memory such as a dynamic random-access memory (DRAM). A part of a memory area of the memory 102 is used to store one or more SQ/CQ pairs. Each SQ/CQ pair includes one or more submission queues (SQ) and a completion queue (CQ) associated with the submission queues (SQs).

The submission queue (SQ) is a queue used to issue commands to the SSD 3. The completion queue (CQ) is a queue used to receive from the SSD 3 a command completion indicating a status of a completed command.

The host 2 transmits various commands to the SSD 3 via one or more submission queues (SQs) included in each SQ/CQ pair.

The SSD 3 is configured to perform communication with the host 2 in conformity with the NVMe standard.

The interface to implement the NVMe standard includes an interface via a PCI Express™ (PCIe™) bus and an interface via a network such as Ethernet™. The former may be called NVMe over PCIe: the latter may be called NVMe over Fabrics (NVMe-oF). The interface standard to which the SSD 3 conforms may be the NVMe over PCIe or may be the NVMe-oF.

In the NVMe standard, a plurality of namespaces may be used. The namespaces are logical address ranges which are independent of each other. The logical address is an address used by the host 2 to logically address a location in a memory space of the SSD 3. As the logical address, a logical block address (LBA) may be used. Each of the namespaces is used by the host 2 to access the SSD 3. Using a plurality of namespaces allows a single storage device to operate as if it were a plurality of storage devices.

In addition, a zoned namespace is defined in the NVMe standard. The zoned namespace is a namespace divided into a plurality of zones. Each of the zones includes continuous logical addresses.

The SSD 3 supports the zoned namespace defined by the NVMe standard. The SSD 3 is configured to write data sequentially to each of the zones included in the zoned namespace.

The SSD 3 includes a controller 4 and a nonvolatile memory (e.g., the NAND flash memory 5). The SSD 3 may also include a random-access memory, e.g., a DRAM 6.

The NAND flash memory 5 includes a memory cell array including a plurality of memory cells arranged in a matrix. The NAND flash memory 5 may be a flash memory having a two-dimensional structure or a flash memory having a three-dimensional structure.

The memory cell array of the NAND flash memory 5 includes a plurality of blocks BLK0 to BLKx-1. Each of the blocks BLK0 to BLKx-1 includes a plurality of pages (pages P0 to Py-1 in this embodiment). Each of the pages includes a plurality of memory cells connected to the same word line. Each of the blocks BLK0 to BLKx-1 is a unit for a data erase operation for erasing data. Each of the pages P0 to Py-1 is a unit for a data write operation for writing data and a data read operation for reading data.

The controller 4 may be implemented with a circuit such as a system-on-a-chip (SoC).

The controller 4 controls a data write operation of writing data received from the host 2 to the NAND flash memory 5 and a data read operation of reading data which is requested by the host 2 from the NAND flash memory 5, by controlling the NAND flash memory 5.

The controller 4 is electrically connected to the NAND flash memory 5 via a NAND interface 13 that conforms to the Toggle NAND flash interface or the open NAND flash interface (ONFI) though it is not limited to these interfaces. The controller 4 operates as a memory controller configured to control the NAND flash memory 5.

The controller 4 may function as a flash translation layer (FTL) configured to execute data management and block management of the NAND flash memory 5.

The data management executed by the FTL includes (1) management of mapping information indicative of a correspondence between each of logical addresses and each of physical addresses of the NAND flash memory 5, (2) a process for concealing restrictions of the NAND flash memory 5 (for example, read/write operations in a page unit and an erase operation in a block unit), etc. The physical address corresponding to a certain logical address indicates a physical storage location in the NAND flash memory 5 to which data corresponding to the logical address is written. The controller 4 manages the correspondence between each of the logical addresses and each of the physical addresses using a logical-to-physical address translation table (L2P table) 31. As described above, a logical block address (LBA) may be used as the logical address.

The controller 4 is also configured to control the NAND flash memory 5 using a zoned namespace defined by the NVMe standard.

FIG. 2 is a diagram illustrating an example of a configuration of one zoned namespace defined by the NVMe standard.

A range of the logical block addresses of each zoned namespace starts with LBA 0. For example, the range of the logical block addresses of the zoned namespace of FIG. 2 includes contiguous z LBAs from LBA 0 to LBA z−1. The zoned namespace is divided into k+1 zones from zone 0 to zone k. Each of these zones includes contiguous non-overlapping logical block addresses.

More specifically, zone 0, zone 1, . . . , and zone k are allocated to the zoned namespace. LBA 0 represents the lowest LBA in zone 0, and LBA z−1 represents the highest LBA in zone k. Zone 1 includes LBA m, LBA m+1, . . . , LBA n−2 and LBA n−1. LBA m represents the lowest LBA in zone 1, and LBA n−1 represents the highest LBA in zone 1.

For example, the controller 4 may manage mapping between each of a plurality of storage areas (physical storage areas) in the NAND flash memory 5 and each of a plurality of zones. In this case, the controller 4 may allocate at least one of a plurality of blocks included in the NAND flash memory 5 as a physical storage area for one zone.

Upon receiving from the host 2 a command requesting the controller 4 to write data to a specific zone, the controller 4 writes data sequentially to the zone specified by the received command, that is, a specific physical storage area in the NAND flash memory 5 allocated to the specific zone. As a result, data corresponding to contiguous LBAs included in the specific zone are written sequentially to contiguous physical storage locations in the specific physical storage area allocated to the specific zone.

In sequential reading of data corresponding to contiguous LBAs included in a certain zone, therefore, the controller 4 can read the data with efficiency only by performing a read access to only at least one block allocated as a physical storage area for the zone.

FIG. 3 is a diagram illustrating an update operation of a write pointer, which is performed in the SSD 3.

The controller 4 of the SSD 3 manages a plurality of write pointers corresponding to a plurality of zones, respectively. Each of the write pointers indicates a next writable LBA in a zone corresponding to the write pointer. When data is sequentially written to a certain zone, the controller 4 increases the value of the write pointer corresponding to the zone by the number of logical blocks to which the data is written.

The update operation of the write pointer will be described with zone 1 as an example. Zone 1 includes a logical block address range from LBA m to LBA m−1. LBA m is the lowest logical block address in zone 1, that is, LBA m is a zone start logical block address (ZSLBA) of zone 1.

When zone 1 is in an empty state that includes no valid data, the write pointer corresponding to zone 1 indicates LBA m that is the zone start logical block address of zone 1. When a write destination location (starting LBA) specified by a command for writing data to zone 1 is equal to the write pointer (here, LBA m) of zone 1, the controller 4 writes data to an LBA range starting with the specified starting LBA, for example, LBA m and LBA m+1. The controller 4 updates the write pointer of zone 1 to increase the value of the write pointer of zone 1 by the number of logical blocks to which the data is written. For example, when the data is written to LBA m and LBA m+1, the controller 4 updates the value of the write pointer to LBA m+2. LBA m+2 represents the lowest LBA of unwritten LBAs in zone 1, that is, a next writable LBA in zone 1.

Return to FIG. 1. the controller 4 includes a host interface 11, a CPU 12, a DRAM interface 14, a direct memory access controller (DMAC) 15, a buffer circuit 16 and an error correction code (ECC) encoder/decoder 17 in addition to the NAND interface 13 described above. The host interface 11, CPU 12, NAND interface 13, DRAM interface 14, DMAC 15, buffer circuit 16 and ECC encoder/decoder 17 are connected to each other via a bus 10.

The host interface 11 is a host interface circuit configured to perform communication with the host 2. The host interface 11 is, for example, a PCIe controller. Alternatively, when the SSD 3 is configured to incorporate a network interface controller, the host interface 11 may be implemented as part of the network interface controller.

The host interface 11 performs communication with the host 2 in compliance with the NVMe standard. The host interface 11 includes an arbitration mechanism. This arbitration mechanism is a mechanism for selecting a submission queue in which a command is to be fetched from among a plurality of submission queues existing on the memory 102 of the host 2. The arbitration mechanism may be a round robin arbitration mechanism or may be a weighted round robin arbitration mechanism.

The host interface 11 receives (fetches) various commands from the host 2. The commands include a zoned namespace command set defined by the NVMe standard. The zoned namespace command set includes a plurality of types of commands for enabling the host 2 to control the SSD 3 using the zoned namespace.

These types of commands include a command for writing data sequentially to a zone. The command includes at least a parameter that defines the zone to which data is to be written.

For example, an address specific write command defined by the zoned namespace command set of the NVMe standard specifies both a zone to which data is to be written and a write destination location (start LBA) in this zone. Examples of the address specific write command include a write command, a write zero command and a copy command.

For example, a write command used as the address specific write command is a command (write request) to write data to be written (user data) to the NAND flash memory 5. The write command includes a namespace identifier to specify a namespace to which the data is to be written, a start LBA, the size of the data (e.g., the number of logical blocks to be written), a data pointer (buffer address) indicating a location in the memory 102 of the host 2 where the data is stored, and the like. Since the write command does not include a dedicated parameter (field) that specifies a zone start logical block address (ZSLBA), the start LBA included in the write command is used as a parameter that specifies both a zone to which data is to be written and a write destination location in this zone. In this case, a higher-order bit portion of the start LBA included in the write command is used as the ZSLBA of a zone to which write data associated with the write command is to be written. A lower-order bit portion of the start LBA included in the write command indicates a write destination location in the zone. Hereinafter, a write command used as the address specific write command is simply referred to as a write command.

When the start LBA specified by the write command requesting the controller 4 to write data to zone 1 is not equal to the LBA indicated by the write pointer of zone 1, the controller 4 aborts the process of the write command. In this case, the controller 4 returns command completion, which indicates an error in writing corresponding to the write command, to the host 2. This can prevent a non-sequential write process from being performed in each zone.

In a case where the host 2 issues to the SSD 3 a write command for requesting the controller 4 to write data to a certain zone, until the host 2 receives a command completion corresponding to this write command from the SSD 3, the host 2 cannot issue a next write command to the same zone. The reason is as follows. Although the NVMe standard basically allows a storage device to execute commands in any order, if the storage device changes the order to execute a plurality of write commands to a zone, an error is likely to occur in the write process to the zone.

Next is a description of a zone append command defined by the zoned namespace command set of the NVMe standard.

Like the write command, the zone append command is a command (write request) for writing data (user data) to the NAND flash memory 5. Unlike the write command, however, the zone append command specifies only a zone to which the data is to be written, and does not specify a write destination location in the zone.

The write destination location in the zone is determined automatically by the controller 4 of the SSD 3 such that the write processes to the zone are sequentially performed. The host 2 is allowed to issue a plurality of zone append commands for specifying the same zone to the SSD 3 simultaneously. The zone append command can thus improve the write performance more than the write command.

The zone append command includes a namespace identifier specifying a namespace to which data is to be written, a zone start logical block address (ZSLBA) indicating the lowest LBA of a zone to which the data is to be written, the size of the data (e.g., the number of logical blocks to be written), a data pointer (buffer address) indicating a location in the memory 102 of the host 2 where the data is stored, and the like. The host 2 can simultaneously issue a plurality of zone append commands that specify the same zone to the SSD 3 via one or more submission queues.

Upon receiving a zone append command from the host 2, the controller 4 refers to a write pointer corresponding to a zone specified by the received zone append command. Then, the controller 4 determines a next writable logical block address indicated by the write pointer as a write destination location in the specified zone. The controller 4 writes data associated with the received zone append command to the determined write destination location in the specified zone. Then, the controller 4 transmits to the host 2 a command completion including information indicating the write destination location (LBA) to which the data is written. The controller 4 thus notifies the host 2 of the LBA to which the data associated with the received zone append command is written.

Hereinafter, as a command for writing data sequentially to a zone, a zone append command will be mainly described. Instead of the zone append command, a write command specifying both a zone and a write destination location in the zone may be used as a command for writing data sequentially to the zone.

The NAND interface 13 is a NAND controller configured to control the NAND flash memory 5 under the control of the CPU 12. When the NAND flash memory 5 includes a plurality of NAND flash memory chips (or, a plurality of NAND flash memory dies), the NAND interface 13 may be connected to the NAND flash memory chips via a plurality of channels (Ch), respectively.

The buffer circuit 16 includes a plurality of buffers (buffer #0, buffer #1, . . . , buffer #q). The buffers #0 to #q are, for example, static random access memories (SRAM). The buffers #0 to #q are allocated in a memory area of the buffer circuit 16. Alternatively, the buffers #0 to #q may be allocated in a memory area of the DRAM 6.

The number of buffers #0 to #q may be set smaller than the number of zones included in the zoned namespace. Each of the buffers #0 to #q is used to temporarily store data to be written to any one or more zones.

The DRAM interface 14 is a DRAM controller configured to control the DRAM 6 under the control of the CPU 12.

A part of the memory area of the DRAM 6 may be used as an area for storing the L2P table 31 and a buffer update history table 32. The buffer update history table 32 is used to manage history information. The history information indicates the order in which the buffers #0 to #q are updated for storing data.

The DMAC 15 transfers data between the memory 102 of the host 2 and each of the buffers #0 to #q under the control of the CPU 12.

When data is to be written to the NAND flash memory 5, the ECC encoder/decoder 17 encodes the data to add an error correction code (ECC) to the data as a redundant code. When data is read from the NAND flash memory 5, the ECC encoder/decoder 17 performs error correction of the data using the ECC added to the data.

The CPU 12 is a processor configured to control the host interface 11, NAND interface 13, DRAM interface 14, DMAC 15, buffer circuit 16 and ECC encoder/decoder 17. The CPU 12 performs various processes by executing a control program (firmware) that is loaded into the DRAM 6 from the NAND flash memory 5 or a ROM (not shown).

The CPU 12 can function as a data/buffer allocation control unit 21 and a data/zone allocation control unit 22. A part or all of each of the data/buffer allocation control unit 21 and data/zone allocation control unit 22 may be implemented by dedicated hardware in the controller 4.

When the controller 4 receives a zone append command from the host 2, the data/buffer allocation control unit 21 determines a buffer (storage destination buffer) to be used for temporarily storing data associated with the received zone append command. In this case, the data/buffer allocation control unit 21 performs the following process to enable data to be distributed to the buffers #0 to #q without being biased to a specific buffer and to enable data that are to be written to the same zone to be stored in the same buffer.

When the buffers #0 to #q do not include a buffer to which a zone specified by the received zone append command is already allocated and when the buffers #0 to #q include a free buffer, the data/buffer allocation control unit 21 determines the free buffer as a storage destination buffer and allocates the zone specified by the received zone append command to the free buffer. The free buffer is a buffer to which no zone is allocated. Then, the data/buffer allocation control unit 21 acquires data associated with the received zone append command from the memory 102 of the host 2, and stores the acquired data in the free buffer determined as the storage destination buffer.

When the buffers #0 to #q include a buffer to which the zone specified by the received zone append command is already allocated, the data/buffer allocation control unit 21 determines the buffer as a storage destination buffer. The data/buffer allocation control unit 21 then acquires data associated with the received zone append command from the memory 102 of the host 2, and stores the acquired data in the buffer determined as the storage destination buffer.

When a zone is already allocated to each of the buffers #0 to #q and the buffers #0 to #q do not include a buffer to which the zone specified by the received zone append command is already allocated, the data/buffer allocation control unit 21 determines a buffer in which the last update for storing data is the oldest among the buffers #0 to #q, as a storage destination buffer in which data associated with the received zone append command is to be stored. The buffer in which the last update for storing data is the oldest is one of the buffers #0 to #q for which the longest time has elapsed since the last update for storing data. The data/buffer allocation control unit 21 additionally allocates the zone specified by the received zone append command to the determined storage destination buffer. Then, the data/buffer allocation control unit 21 acquires the data associated with the received zone append command from the memory 102 of the host 2, and stores the acquired data in the determined storage destination buffer.

The data/zone allocation control unit 22 selects, as a flush target zone, (i) a zone which stores data of the total size equal to or larger than a unit of write for the NAND flash memory 5 (hereinafter referred to simply as a write unit) in any one of the buffers #0 to #q, or (ii) a zone which stores corresponding data of the largest total size among all zones which store corresponding data in a buffer in a full-state.

The buffer in the full-state is a buffer which is filled in its entirety with data. When data having a buffer size are accumulated in any one of the buffers #0 to #q, this buffer is brought into the full state. The flush target zone means a zone where a flush process is to be performed. The flush process is a process of reading data from a buffer and writing the read data to the NAND flash memory 5.

The write unit for the NAND flash memory 5 may be set, for example, to a size that is a multiple of a page size. The page size is a size of data that can be stored in one page. The write unit for the NAND flash memory 5 may be set to the same size as the page size, may be set to twice the page size, or may be set to three or more times the page size.

Alternatively, the write unit for the NAND flash memory 5 may be set to, for example, a multiple of a block size. The block size is a size of data that can be stored in one block. The write unit for the NAND flash memory 5 may be set to the same size as the block size, may be set to twice the block size, or may be set to three or more times the block size.

The size of each of the buffers #0 to #q may be set to be larger than the write unit for the NAND flash memory 5. When the total size of data associated with a certain zone that is stored in a certain buffer becomes the write unit for the NAND flash memory 5 or more, the data/zone allocation control unit 22 selects this zone as the flush target zone.

Even though the size of data of any zone stored in a buffer is less than the write unit for the NAND flash memory 5, the buffer may be brought into a full state. In this case, the data/zone allocation control unit 22 selects a zone which stores corresponding data of the largest total size among all zones which store corresponding data in a buffer in the full-state, as the flush target zone.

After selecting the flush target zone, the data/zone allocation control unit 22 extracts only data of the flush target zone from data of all zones stored in a buffer that stores data of the selected flush target zone. In this case, the data/zone allocation control unit 22 extracts only the data of the flush target zone while maintaining the data of each of the zones other than the flush target zone in the buffer. Then, the data/zone allocation control unit 22 writes the extracted data to a specific physical storage area in the NAND flash memory 5 allocated to the flush target zone.

In order to implement a process of extracting only the data of the flush target zone while maintaining the data of a zone other than the flush target zone in the buffer, each of the buffers #0 to #q may be implemented as a first-in first-out buffer (FIFO buffer) with an overtaking control function.

The FIFO buffer with the overtaking control function includes, for example, an input port for inputting data, an output port for outputting data, and a path for connecting the output port to the input port. This path is also referred to as a loopback path.

When a certain FIFO buffer is in a full state or when the total size of data of a specific zone stored in the FIFO buffer becomes equal to or larger than the write unit for the NAND flash memory 5, the data/zone allocation control unit 22 determines whether or not next data readable from this FIFO buffer is data of a flush target zone. The next data readable from a FIFO buffer means the oldest data among the data stored in the FIFO buffer.

When the next data readable from the FIFO buffer is data of a zone other than the flush target zone, the data/zone allocation control unit 22 performs a process of writing the data of the other zone back to the FIFO buffer. In this case, the data/zone allocation control unit 22 performs a read operation and a write operation for the FIFO buffer while enabling the loopback path of the FIFO buffer. Thus, the data/zone allocation control unit 22 performs in parallel an operation of reading the data of the other zone from the FIFO buffer and an operation of writing the read data back to the FIFO buffer.

When the next data readable from the FIFO buffer is the data of the flush target zone, the data/zone allocation control unit 22 performs a normal operation of reading the data of the flush target zone from the FIFO buffer without writing the data of the flush target zone back to the FIFO buffer. In this case, the data/zone allocation control unit 22 performs a read operation while disabling the loopback path of the FIFO buffer, thereby reading the data of the flush target zone from the FIFO buffer.

Until all the data of the flush target zone are read from the FIFO buffer, the data/zone allocation control unit 22 selectively performs the foregoing write-back process and normal read process as necessary.

As described above, by enabling or disabling the loopback path of the FIFO buffer, the data/zone allocation control unit 22 can perform a process of reading only the data of the flush target zone from the FIFO buffer while maintaining data older than the data of the flush target zone in the FIFO buffer. This process may be referred to as an overtaking process. This overtaking process makes it possible to extract only the data of the flush target zone from the FIFO buffer while the data of a zone other than the flush target zone is maintained in the FIFO buffer.

Next is a detailed description of a buffering process of the present embodiment. Prior to the detailed description, a buffering process of a comparative example will be described first.

FIG. 4 illustrates the buffering process performed in a memory system according to the comparative example. As the buffering process performed in the memory system (e.g., SSD) according to the comparative example, a buffering process using the same number of buffers as the number of zones will be described here.

As illustrated in FIG. 4, in the comparative example, there is a one-to-one correspondence between a plurality of zones and a plurality of buffers. The zones managed in the SSD according to the comparative example are k+1 zones from zone 0 to zone k. In this case, it is necessary to prepare k+1 buffers from buffer #0 to buffer #k in the SSD of the comparative example.

Buffer #0 is used to store only data to be written to zone 0. Buffer #1 is used to store only data to be written to zone 1. Buffer #2 is used to store only data to be written to zone 2. Buffer #3 is used to store only data to be written to zone 3. Buffer #k is used to store only data to be written to zone k.

When a host issues a zone append command specifying zone 0 to the SSD of the comparative example, an input controller of the SSD stores data associated with the zone append command in buffer #0. Similarly, when the host issues a zone append command specifying zone 1 to the SSD, the input controller stores data associated with the zone append command in buffer #1. When a predetermined amount or more of data is accumulated in any one of buffers #0 to #k, sequential writing is started to a zone corresponding to the one of buffers #0 to #k.

The buffering process of the comparative example illustrated in FIG. 4 requires the same number of buffers as the number of zones. If, therefore, the number of zones that need to be managed in the SSD is large, a large number of buffers, that is, a large number of memory resources are required.

As another buffering process according to the comparative example, a buffering process in which the number of buffers to be prepared in the SSD is simply reduced will be described. FIG. 5 illustrates another buffering process to be performed in the memory system according to the comparative example.

As illustrated in FIG. 5, in the comparative example, the zones managed in the SSD are k+1 zones from zone 0 to zone k. The buffers prepared in the SSD are four buffers from buffer #0 to buffer #3. In the comparative example, the number of buffers (=4) is smaller than the number of zones (k+1). Accordingly, each of buffers #0 to #3 is shared by several zones.

As a method of enabling each of buffers #0 to #3 to be shared by several zones, two methods may be conceived. In a first method, data of each zone is written to the NAND flash memory in small units. In a second method, data is accumulated in the buffer up to a predetermined amount and data of each zone is written to the NAND flash memory in units of the predetermined amount of data.

In the first method, for example, when a zone append command specifying a zone other than zones 0 to 3 (for example, zone #k) is received from the host 2 while data of zones 0 to 3 are stored in buffers #0 to #3, respectively, a flush process needs to be performed for data stored in any one of buffers #0 to #3.

For example, when the data of zone #k is to be stored in buffer #0, the output control unit performs a flush process for the data of zone 0 already stored in buffer #0. In this case, even though the size of data of zone 0 already stored in buffer #0 is relatively small, the data of zone 0 is read from buffer #0. The read data of zone 0 is written to a block in the NAND flash memory 5 allocated to zone 0.

The first method can prevent data of different zones from being mixed in one buffer. In the first method, however, data of each zone is written to a block of the NAND flash memory in small units. Therefore, a relatively long time may be required from the start of writing to a block until the block is entirely filled with data. If a state in which data is partially written to a block is maintained for a long period of time, the reliability of the data written to the block may be lowered. If, furthermore, the number of blocks to which data is partially written increases, blocks that are available as new write destination blocks are likely to be exhausted.

In the second method, a predetermined amount of data is accumulated in each buffer and then the data is written to the NAND flash memory. Thus, data of different zones are mixed in one buffer. The mixture of data of different zones is likely to cause fragmentation in which data of the same zone is distributed to different locations in one buffer. If fragmentation occurs, the output control unit needs to write the data of each zone to the NAND flash memory in small units, as in the first method.

Next is a description of a buffering process according to the present embodiment. FIG. 6 is a diagram illustrating a buffering process to be performed in the SSD 3 according to the present embodiment.

In FIG. 6, there are eight zones from zone 0 to zone 7 to be managed by the SSD 3. There are four buffers from buffer #0 to buffer #3 prepared in the SSD 3. The number of zones and the number of buffers indicated here are examples, and the number of zones and the number of buffers may be larger or smaller. However, the number of buffers is smaller than the number of zones.

Buffer #0 includes a first-in first-out (FIFO) buffer 201, a flush control unit 202 and an allocation management table 203. Similarly, buffer #1 includes a FIFO buffer 211, a flush control unit 212 and an allocation management table 213. Buffer #2 includes a FIFO buffer 221, a flush control unit 222 and an allocation management table 223. Buffer #3 includes a FIFO buffer 231, a flush control unit 232 and an allocation management table 233.

Each of the FIFO buffers 201 to 231 is used to temporarily store data to be written to any one or more of zones 0 to 7. Each of the FIFO buffers 201 to 231 can be implemented as a FIFO buffer with the overtaking control function.

Each of the flush control units 202 to 232 performs a flush process to write data stored in the FIFO buffer to the NAND flash memory 5 in cooperation with the data/zone allocation control unit 22. In the present embodiment, when the total size of data of one zone stored in any one of buffers #0 to #3 becomes equal to or larger than the write unit, that is, when the total size of data of one zone stored in any one of the FIFO buffers 201 to 231 included in their respective buffers #0 to #3 becomes equal to or larger than the write unit, the flush process is started.

The flush process is also performed when a certain one of buffers #0 to #3 becomes full, that is, when a certain one of the FIFO buffers 201 to 231 included in their respective buffers #0 to #3 becomes full. That is, when any FIFO buffer becomes full, data of a zone whose total size is the largest among data of all zones stored in the FIFO buffers, is written to the NAND flash memory 5.

Each of the flush control units 202 to 232 may determine whether its corresponding one of buffers #0 to #3 satisfies a flush start condition. In the present embodiment, when a condition that the total size of data of one zone stored in one of buffers #0 to #3 is equal to or larger than the write unit is satisfied, the flush control unit determines that the buffer satisfies the flush start condition. Also, when one of buffers #0 to #3 becomes a full state in which the buffer is entirely filled with data, the flush control unit determines that the buffer satisfies the flush start condition.

Since each of buffers #0 to #3 is configured to store data in a FIFO buffer included therein, the state of each of buffers #0 to #3 is the same as that of a corresponding one of the FIFO buffers 201 to 231 included therein. Therefore, the process of determining whether each of buffers #0 to #3 satisfies the flush condition can also be performed by determining whether each of the FIFO buffers 201 to 231 satisfies the flush condition. The buffering process of the present embodiment will be described mainly by exemplifying a case where each of the flush control units 202 to 232 determines whether its corresponding one of the FIFO buffer 201 to 231 satisfies the flush start condition.

That is, each of the flush control units 202 to 232 determines whether its corresponding FIFO buffer satisfies the flush start condition. In the present embodiment, when the condition that the total size of data of one zone stored in a certain FIFO buffer is equal to or larger than the write unit is satisfied, it is determined that the FIFO buffer satisfies the flush start condition. Also, when a FIFO buffer is entirely filled with data, it is also determined that the FIFO buffer satisfies the flush start condition.

Each of the allocation management tables 203 to 233 is a management table for managing identifiers of one or more zones allocated to the corresponding FIFO buffer. For example, when the FIFO buffer 201 is determined as a storage destination buffer in which data of zone 0 is to be stored, zone 0 is allocated to the FIFO buffer 201. Then, an identifier indicating zone 0 is stored in the allocation management table 203 corresponding to the FIFO buffer 201.

In the initial state, each of buffers #0 to #3 is a free buffer. That is, each of the FIFO buffers 201 to 231 included in buffers #0 to #3 is a free FIFO buffer. The free FIFO buffer is a FIFO buffer to which no zone is allocated.

When the controller 4 receives a zone append command specifying a specific zone from the host 2 in a state in which each of the FIFO buffers 201 to 231 is free, that is, each of buffers #0 to #3 is free, the data/buffer allocation control unit 21 determines one free buffer, for example, buffer #0, as a storage destination buffer in which data of the specific zone is to be stored. The data/buffer allocation control unit 21 allocates the specific zone to buffer #0. Then, the data/buffer allocation control unit 21 stores the data associated with the received zone append command in the FIFO buffer 201 of buffer #0. The data/buffer allocation control unit 21 also stores an identifier indicating the specific zone in the allocation management table 203 of buffer #0. Furthermore, the data/buffer allocation control unit 21 stores information indicating a buffer that is last updated for storing data (here, an identifier indicating buffer #0) in the buffer update history management table 32.

When the controller 4 receives a new zone append command from the host 2 specifying another specific zone, the data/buffer allocation control unit 21 determines one free buffer, for example, buffer #1 as a storage destination buffer in which data of said another specific zone are to be stored. The data/buffer allocation control unit 21 allocates said another specific zone to buffer #1. Then, the data/buffer allocation control unit 21 stores data associated with the received new zone append command in the FIFO buffer 211 of buffer #1. The data/buffer allocation control unit 21 also stores an identifier indicating said another specific zone in the allocation management table 213 of buffer #1. Furthermore, the data/buffer allocation control unit 21 stores information indicating a buffer that is last updated for storing data (here, an identifier indicating buffer #1) in the buffer update history management table 32.

Thus, four zones are allocated to four buffers #0 to #3, namely, four FIFO buffers 201 to 231, respectively.

When the controller 4 receives a zone append command from the host 2 specifying a specific zone that is already allocated to any of buffers #0 to #3, the data/buffer allocation control unit 21 stores data associated with the received zone append command in a FIFO buffer of the buffer to which the specific zone is already allocated.

For example, when the controller 4 receives a zone append command from the host 2 specifying the same zone as a zone that is already allocated to buffer #0, the data/buffer allocation control unit 21 stores data associated with the received zone append command in the FIFO buffer 201 of buffer #0. Then, the data/buffer allocation control unit 21 stores information indicating a buffer that is last updated for storing data (here, an identifier indicating buffer #0) in the buffer update history management table 32.

When the controller 4 receives a zone append command from the host 2 specifying a new zone other than the four zones that are already allocated to four buffers #0 to #3, the data/buffer allocation control unit 21 refers to the buffer update history table 32 to determine a buffer of which the last update for storing data is the oldest among buffers #0 to #3. The data/buffer allocation control unit 21 additionally allocates the new zone to the determined buffer.

When a buffer of which the last update for storing data is the oldest is, for example, buffer #0, the data/buffer allocation control unit 21 additionally allocates the new zone to buffer #0. Then, the data/buffer allocation control unit 21 stores data associated with the received zone append command in the FIFO buffer 201 of buffer #0. The data/buffer allocation control unit 21 also stores an identifier indicating the new zone in the allocation management table 203 of buffer #0. Furthermore, the data/buffer allocation control unit 21 stores information indicating a buffer that is last updated for storing data (here, an identifier indicating buffer #0) in the buffer update history management table 32.

As described above, a new zone is additionally allocated to a buffer whose last update for storing data is the oldest. Therefore, the data/buffer allocation control unit 21 can prevent a buffer which is to be used for storing data from being biased to a specific buffer. As a result, data to be written to zones 0 to 7 can be distributed to buffers #0 to #3.

When any one of the FIFO buffers 201 to 231 satisfies the flush start condition, the data/zone allocation control unit 22 extracts only data of a flush target zone from the data stored in the FIFO buffer while maintaining data of zones other than the flush target zone in the FIFO buffer. The data of the flush target zone is write data associated with one or more zone append commands that specify the flush target zone. Then, the data/zone allocation control unit 22 writes the extracted data, namely, write data associated with several zone append commands specifying the flush target zone, in a logical block range starting from the next writable LBA of the flush target zone. Thus, sequential write to the flush target zone is executed.

As described above, one of the physical storage areas in the NAND flash memory 5 is allocated to each of zones 0 to 7. In a write operation to the flush target zone, thus, the data/zone allocation control unit 22 first determines a physical storage area allocated to the flush target zone and a write destination location in the physical storage area. Then, the data/zone allocation control unit 22 writes the write data to continuous physical storage locations starting from the determined write destination location in the determined physical storage area such that the data associated with the zone append commands are arranged on the determined physical storage area in the same order as the order in which the zone append commands are issued.

Examples of the buffering process according to the embodiment will be described below with reference to FIGS. 7A to 7D. In the examples, as in FIG. 6, there are eight zones from zone 0 to zone 7 managed by the SSD 3, and there are four buffers from buffer #0 to buffer #3 prepared in the SSD 3.

Figure 7A:
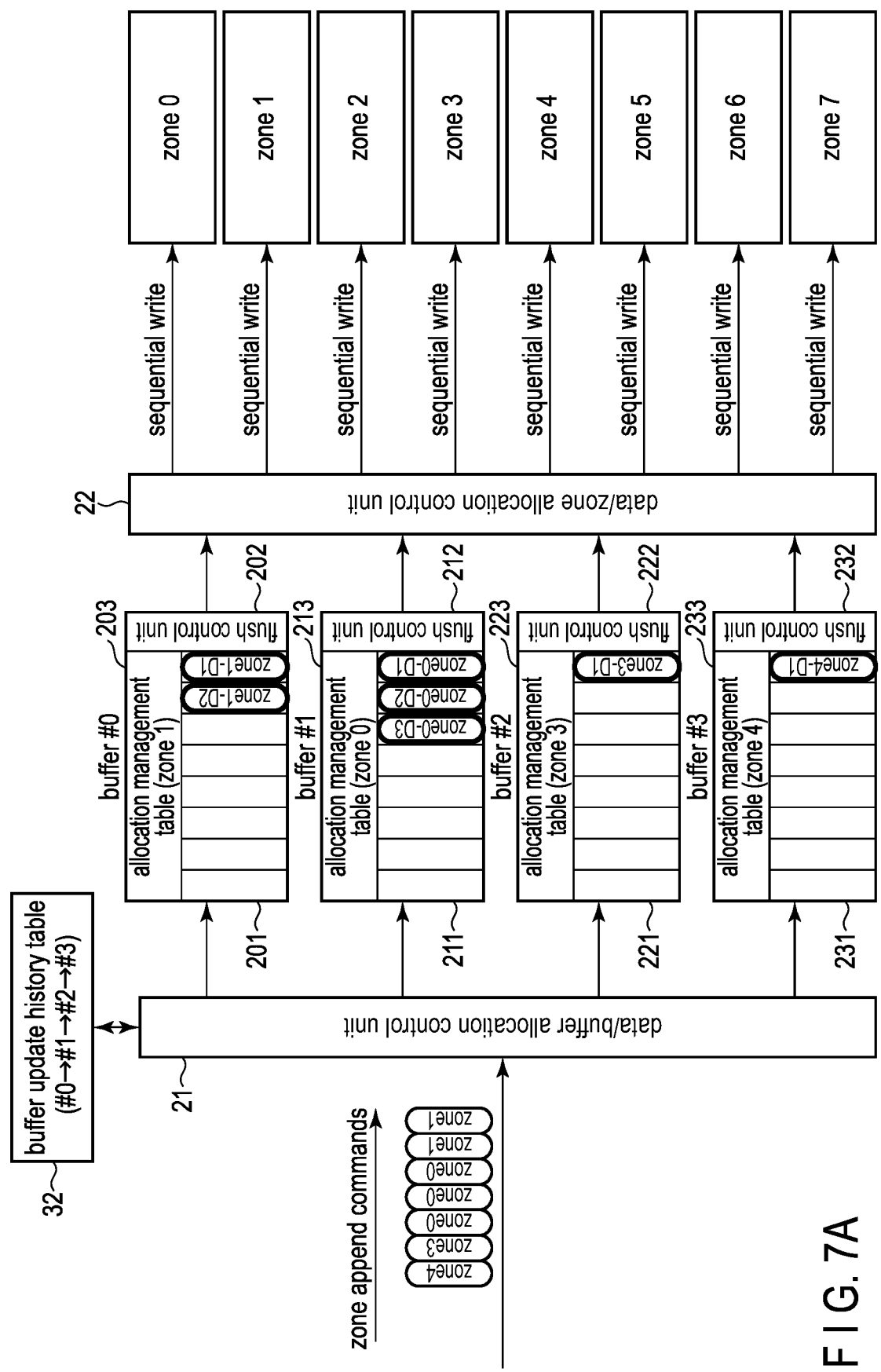
FIG. 7A is a diagram illustrating a first process of the buffering process performed in the memory system according to the embodiment.

FIG. 7A is a diagram illustrating a first process of the buffering process performed in the SSD 3.

Assume here that the controller 4 receives from the host 2 two zone append commands specifying zone 1, three zone append commands specifying zone 0, one zone append command specifying zone 3, and one zone append command specifying zone 4 in the order presented.

The data/buffer allocation control unit 21 allocates the four zones specified by the received zone append commands, namely, zone 1, zone 0, zone 3 and zone 4 to buffer #0, buffer #1, buffer #2 and buffer #3, respectively.

More specifically, the controller 4 first receives a first zone append command specifying zone 1 from the host 2. There are no buffers to which zone 1 is already allocated. The data/buffer allocation control unit 21 thus allocates zone 1 to buffer #0 to which no zone is allocated. The data/buffer allocation control unit 21 adds an identifier indicating zone 1 to the allocation management table 203 of buffer #0. Then, the data/buffer allocation control unit 21 acquires "zone1-D1" which is data associated with the first zone append command, from the memory 102 of the host 2, and stores the acquired data "zone1-D1" in the FIFO buffer 201. After that, the data/buffer allocation control unit 21 adds to the buffer update history table 32 information indicating a buffer that is last updated for storing data (here, an identifier indicating buffer #0).

The controller 4 receives a second zone append command specifying zone 1 from the host 2. Since zone 1 is already allocated to buffer #0, the data/buffer allocation control unit 21 determines buffer #0 as a data storage destination buffer for data associated with the second zone append command. The data/buffer allocation control unit 21 acquires "zone1-D2" which is data associated with the second zone append command from the memory 102 of the host 2, and stores the acquired data "zone1-D2" in the FIFO buffer 201. The identifier of a buffer that is last added to the buffer update history table 32 is the identifier of buffer #0. Here, it is thus possible to omit a process of adding to the buffer update history table 32 the identifier of buffer #0 in which data "zone1-D2" is stored.

Note that even though the identifier of the buffer that is last updated for storing data is the same as that of the buffer last added to the buffer update history table 32, the identifier of the buffer that is last updated may be added to the buffer update history table 32. Hereinafter, it is assumed that the identifier of the buffer that is last updated for storing data is added to the buffer update history table 32 only when the identifier of the buffer that is last updated for storing data differs from that of the buffer last added to the buffer update history table 32, though the embodiment is not limited to this assumption.

The controller 4 receives a first zone append command specifying zone 0 from the host 2. Since there are no buffers to which zone 0 is already allocated, the data/buffer allocation control unit 21 allocates zone 0 to buffer #1 to which no zone is allocated. The data/buffer allocation control unit 21 adds an identifier indicating zone 0 to the allocation management table 213 of buffer #1. Then, the data/buffer allocation control unit 21 acquires "zone0-D1" which is data associated with the first zone append command, from the memory 102 of the host 2, and stores the acquired data "zone0-D1" in the FIFO buffer 211. After that, the data/buffer allocation control unit 21 adds to the buffer update history table 32 information indicating a buffer that is last updated for storing data (here, an identifier indicating buffer #1).

The controller 4 receives a second zone append command specifying zone 0 from the host 2. Since zone 0 is already allocated to buffer #1, the data/buffer allocation control unit 21 determines buffer #1 as a data storage destination buffer for data associated with the second zone append command. The data/buffer allocation control unit 21 acquires "zone0-D2" which is data associated with the second zone append command, from the memory 102 of the host 2, and stores the acquired data "zone0-D2" in the FIFO buffer 211.

The controller 4 receives a third zone append command specifying zone 0 from the host 2. Since zone 0 is already allocated to buffer #1, the data/buffer allocation control unit 21 determines buffer #1 as a data storage destination buffer for data associated with the third zone append command. The data/buffer allocation control unit 21 acquires "zone0-D3" which is data associated with the third zone append command, from the memory 102 of the host 2, and stores the acquired data "zone0-D3" in the FIFO buffer 211.

The controller 4 receives a first zone append command specifying zone 3 from the host 2. Since there are no buffers to which zone 3 is already allocated, the data/buffer allocation control unit 21 allocates zone 3 to buffer #2 to which no zone is allocated. The data/buffer allocation control unit 21 adds an identifier indicating zone 3 to the allocation management table 223 of buffer #2. Then, the data/buffer allocation control unit 21 acquires "zone3-D1" which is data associated with the first zone append command, from the memory 102 of the host 2, and stores the acquired data "zone3-D1" in the FIFO buffer 221. After that, the data/buffer allocation control unit 21 adds to the buffer update history table 32 information indicating a buffer that is last updated for storing data (here, an identifier indicating buffer #2).

The controller 4 receives a first zone append command specifying zone 4 from the host 2. Since there are no buffers to which zone 4 is already allocated, the data/buffer allocation control unit 21 allocates zone 4 to buffer #3 to which no zone is allocated. The data/buffer allocation control unit 21 adds an identifier indicating zone 4 to the allocation management table 233 of buffer #3. Then, the data/buffer allocation control unit 21 acquires "zone4-D1" which is data associated with the first zone append command, from the memory 102 of the host 2, and stores the acquired data "zone4-D1" in the FIFO buffer 231. After that, the data/buffer allocation control unit 21 adds to the buffer update history table 32 information indicating a buffer that is last updated for storing data (here, an identifier indicating buffer #3).

Figure 7B:
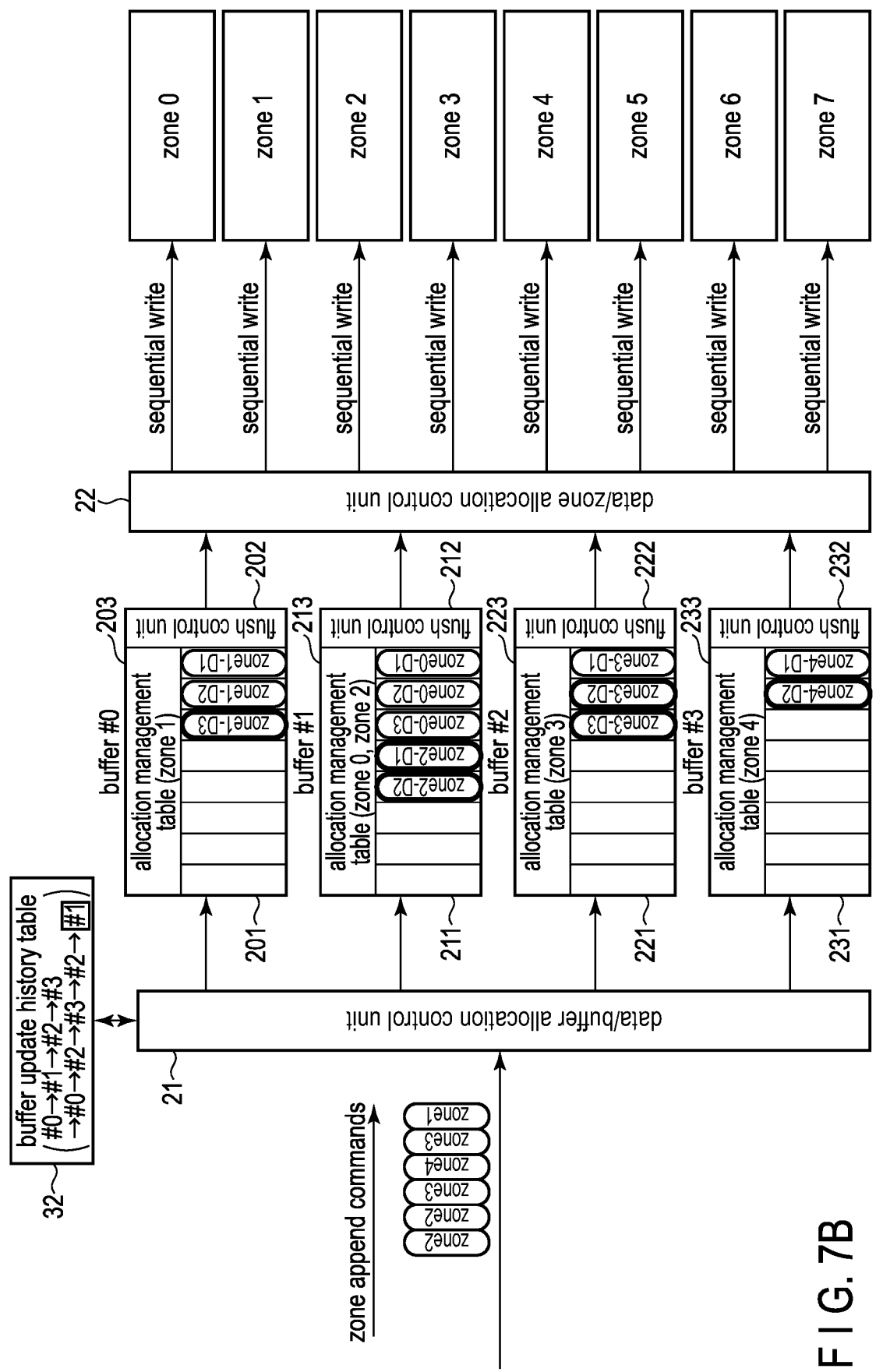
FIG. 7B is a diagram illustrating a second process of the buffering process performed in the memory system according to the embodiment.

FIG. 7B is a diagram illustrating a second process of the buffering process according to the embodiment.

Assume here that after receiving the seven zone append commands described with reference to FIG. 7A, the controller 4 receives from the host 2 one zone append command specifying zone 1, one zone append command specifying zone 3, one zone append command specifying zone 4, and one zone append command specifying zone 3 in the order presented.

Zone 1, zone 3 and zone 4 are already allocated to buffer #0, buffer #2 and buffer #3, respectively. Thus, the data/buffer allocation control unit 21 performs a procedure similar to that described with reference to FIG. 7A to store data "zone1-D3" associated with the zone append command specifying zone 1, data "zone3-D2" associated with the zone append command specifying zone 3, data "zone4-D2" associated with the zone append command specifying zone 4, and data "zone3-D3" associated with the zone append command specifying zone 3, in the FIFO buffer 201 of buffer #0, the FIFO buffer 221 of buffer #2, the FIFO buffer 231 of buffer #3, and the FIFO buffer 221 of buffer #2, respectively. Then, the data/buffer allocation control unit 21 adds the identifiers of buffer #0, buffer #2, buffer #3 and buffer #2 in this order to the buffer update history table 32.

It is then assumed that the controller 4 receives a first zone append command specifying zone 2 from the host 2.

There are no buffers to which zone 2 is already allocated. Also, there is no free buffer. Thus, the data/buffer allocation control unit 21 refers to the buffer update history table 32 to determine a buffer of which the last update for storing data is the oldest among buffers #0 to #3. In the buffer update history table 32, information indicating that "the buffer whose last update is the oldest is buffer #1, the buffer whose last update is the secondary oldest is buffer #0, the buffer whose last update is the thirdly oldest is buffer #3, and the buffer whose last update is the newest is buffer #2" is stored as history information.

Therefore, the data/buffer allocation control unit 21 additionally allocates zone 2 to buffer #1 of which the last update for storing data is the oldest. In this case, the data/buffer allocation control unit 21 adds an identifier indicating zone 2 to the allocation management table 213 of buffer #1. Then, the data/buffer allocation control unit 21 acquires "zone2-D1" which is data associated with the first zone append command specifying zone 2, from the memory 102 of the host 2, and stores the acquired data "zone2-D1" in the FIFO buffer 211. After that, the data/buffer allocation control unit 21 adds to the buffer update history table 32 information indicating a buffer that is last updated for storing data (here, an identifier indicating buffer #1).

It is then assumed that the controller 4 receives a second zone append command specifying zone 2 from the host 2.

Zone 2 is already allocated to buffer #1. The data/buffer allocation control unit 21 thus determines buffer #1 as a storage destination buffer for data associated with the second zone append command specifying zone 2. The data/buffer allocation control unit 21 acquires "zone2-D2" which is data associated with the second zone append command, from the memory 102 of the host 2, and stores the acquired data "zone2-D2" in the FIFO buffer 211.

Figure 7C:
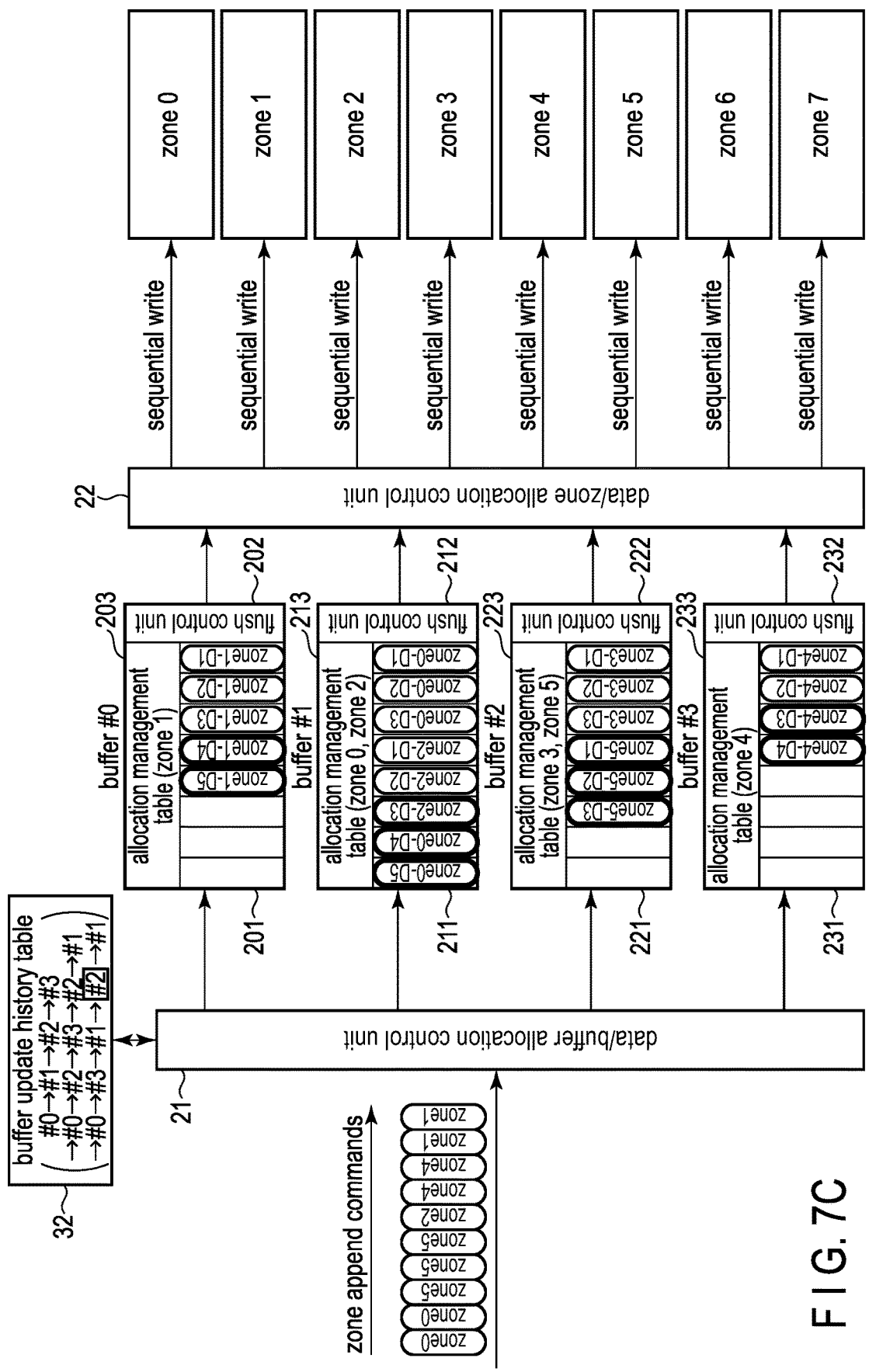
FIG. 7C is a diagram illustrating a third process of the buffering process performed in the memory system according to the embodiment.

FIG. 7C is a diagram illustrating a third process of the buffering process according to the embodiment.

Assume here that after receiving the seven zone append commands described with reference to FIG. 7A and the six zone append commands described with reference to FIG. 7B, the controller 4 receives from the host 2 two zone append command specifying zone 1, two zone append command specifying zone 4, and one zone append command specifying zone 2 in the order presented.

Zone 1, zone 4 and zone 2 are already allocated to buffer #0, buffer #3 and buffer #1, respectively. Thus, the data/buffer allocation control unit 21 stores data "zone1-D4" and data "zone1-D5" associated with their respective two zone append commands specifying zone 1 in the FIFO buffer 201 of buffer #0, stores data "zone4-D3" and data "zone4-D4" associated with their respective two zone append commands specifying zone 4 in the FIFO buffer 231 of buffer #3, and stores data "zone2-D3" associated with the one zone append command specifying zone 2 in the FIFO buffer 211 of buffer #1. Then, the data/buffer allocation control unit 21 adds the identifiers of buffer #0, buffer #3 and buffer #1 in this order to the buffer update history table 32.

It is then assumed that the controller 4 receives a first zone append command specifying zone 5 from the host 2.

There are no buffers to which zone 5 is already allocated. Also, there is no free buffer. Thus, the data/buffer allocation control unit 21 refers to the buffer update history table 32 to determine a buffer of which the last update for storing data is the oldest. The buffer of which the last update for storing data is the oldest is buffer #2.

Therefore, the data/buffer allocation control unit 21 additionally allocates zone 5 to buffer #2 whose last update for storing data is the oldest. In this case, the data/buffer allocation control unit 21 adds an identifier indicating zone 5 to the allocation management table 223 of buffer #2. Then, the data/buffer allocation control unit 21 stores "zone5-D1" which is data associated with the first zone append command specifying zone 5 in the FIFO buffer 221. After that, the data/buffer allocation control unit 21 adds to the buffer update history table 32 information indicating a buffer that is last updated for storing data (here, an identifier indicating buffer #2).

Then, the controller 4 receives a second zone append command specifying zone 5 and a third zone append command specifying zone 5 from the host 2.

Zone 5 is already allocated to buffer #2. The data/buffer allocation control unit 21 thus stores in the FIFO buffer 221 "zone5-D2" which is data associated with the second zone append command and "zone5-D3" which is data associated with the third zone append command.

It is then assumed that the controller 4 receives two zone append commands specifying zone 0 from the host 2.

Zone 0 is already allocated to buffer #1. The data/buffer allocation control unit 21 thus stores in the FIFO buffer 211 data "zone0-D4" and data "zone0-D5" associated with the two zone append commands. After that, the data/buffer allocation control unit 21 adds to the buffer update history table 32 information indicating a buffer that is last updated for storing data (here, an identifier indicating buffer #1).

Since data "zone0-D5" is stored in the FIFO buffer 221 of buffer #1, the FIFO buffer 221 is brought into a full state in which no more data can be stored. Since the FIFO buffer 221 is in the full state, the FIFO buffer 221 satisfies the flush start condition.

Figure 7D:
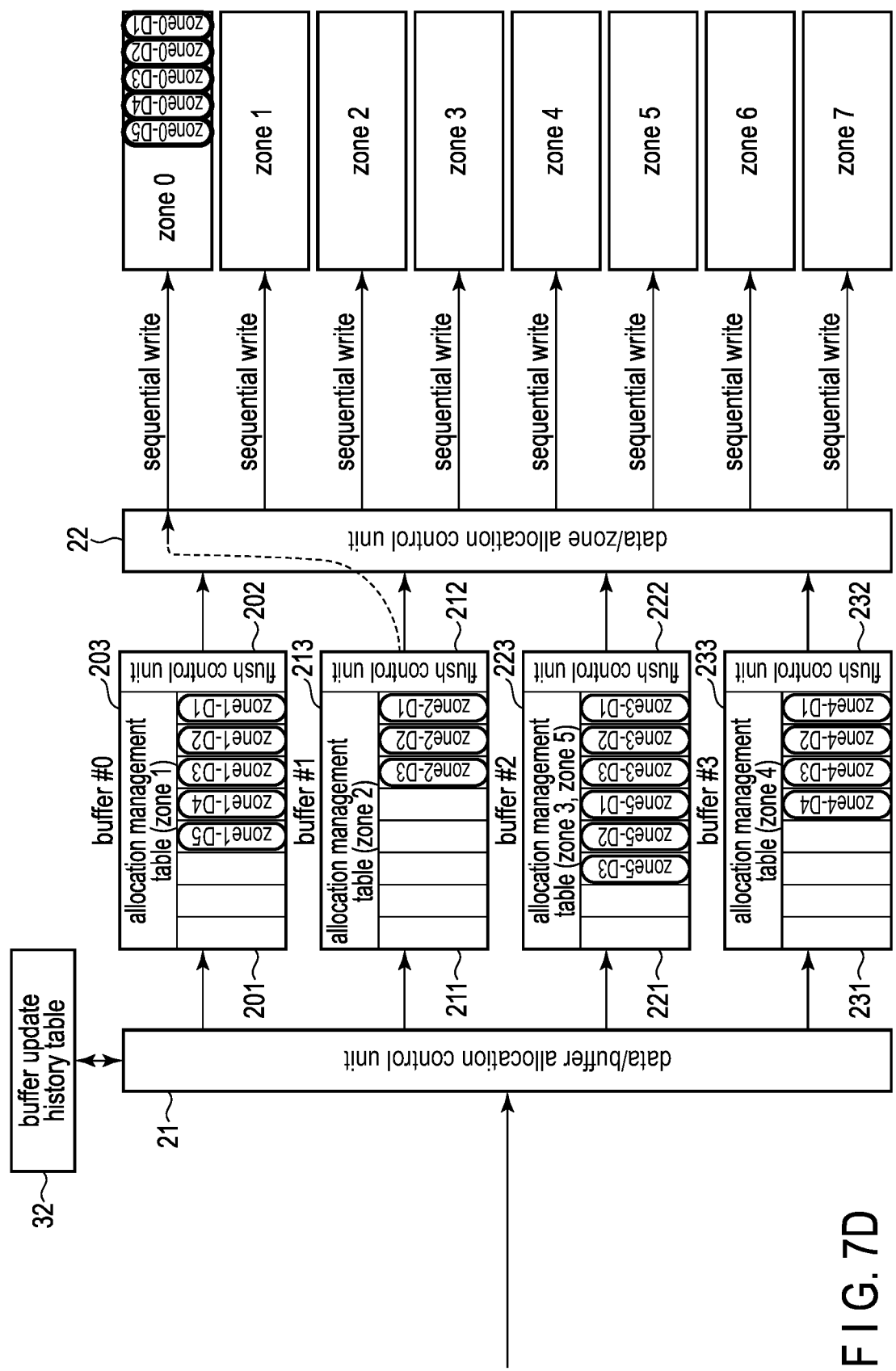
FIG. 7D is a diagram illustrating a fourth process of the buffering process performed in the memory system according to the embodiment.

FIG. 7D is a diagram illustrating a fourth process of the buffering process according to the embodiment.

The data/zone allocation control unit 22 selects a flush target zone from buffer #1 and extracts only data associated with the flush target zone from all data stored in buffer #1.

Buffer #1 (that is, FIFO buffer 211) stores data "zone0-D1" to "zone0-D5" associated with zone 0 and data "zone2-D1" to "zone2-D3" associated with zone 2. In buffer #1, zone 0 has the largest total size of associated data. The data/zone allocation control unit 22 thus determines zone 0 as the flush target zone.

The data/zone allocation control unit 22 extracts only data associated with zone 0 from buffer #1. At this time, the data/zone allocation control unit 22 controls data associated with a zone other than the flush target zone such that the data is maintained in buffer #1. In other words, the data/zone allocation control unit 22 extracts data "zone0-D1" to "zone0-D5" from buffer #1 while maintaining data "zone2-D1" to "zone2-D3" in buffer #1. Then, the data/zone allocation control unit 22 determines a write destination zone, and writes data "zone0-D1" to "zone0-D5" sequentially to the determined write destination zone (here, zone 0). When the data of zone 0 is removed from buffer #1, the data/zone allocation control unit 22 deletes the identifier of zone 0 from the allocation management table 213. Accordingly, the allocation of zone 0 to buffer #1 is canceled.

Therefore, when a zone append command specifying zone 0 is received after the data of zone 0 is removed from buffer #1, there is no buffer to which zone 0 is already allocated. The data/buffer allocation control unit 21 thus refers to the buffer update history table 32 to determine a buffer of which the last update for storing data is the oldest and store data associated with the received zone append command in the determined buffer.

An example of the overtaking process for extracting data associated with zone 0 from buffer #1 will be described below with reference to FIGS. 8A to 8E.

FIG. 8A is a diagram illustrating a first process of the overtaking process performed in the SSD 3.

The FIFO buffer 211 of buffer #1 includes an input port 211A, an output port 211B, a loopback path 211C, an input selector 211D and an output selector 211E. The loopback path 211C is a path connecting the output port 211B and the input port 211A. The input selector 211D and output selector 211E are switch circuits that enable or disable the loopback path 211C.

The input port 211A of the FIFO buffer 211 is connected to the input selector 211D. The output port 211B of the FIFO buffer 211 is connected to the output selector 211E. The input selector 211D selects one of the loopback path 211C and external input, and connects the selected one of the loopback path 211C and external input to the input port 211A. The output selector 211E selects one of the loopback path 211C and external output and connects the output port 211B to the selected one of the loopback path 211C and external output. The external output is connected to the NAND flash memory 5 via the NAND interface 13 illustrated in FIG. 1.

When the next data readable from the FIFO buffer 211, that is, the oldest data in the FIFO buffer 211, is data of a zone other than a flush target zone, the data/zone allocation control unit 22 controls the input selector 211D and output selector 211E to enable the loopback path 211C and connect the output port 211B to the input port 211A. When the next data readable from the FIFO buffer 211 is data of the flush target zone, the data/zone allocation control unit 22 controls the output selector 211E to disable the loopback path 211C and connect the output port 211B to the external output. In this case, the data/zone allocation control unit 22 may control the input selector 211D to connect the input port 211A to the loopback path 211C.

When a flush process is started, the data/zone allocation control unit 22 first controls the input selector 211D to disconnect the input port 211A and the external input from each other and connect the input port 211A to the loopback side, namely, to the loopback path 211C in order to prevent new data from being stored in the FIFO buffer 211, as illustrated in FIG. 8A.

FIG. 8B is a diagram illustrating a second process of the overtaking process according to the embodiment.

The data/zone allocation control unit 22 determines whether the next data readable from the FIFO buffer 211 is data of the flush target zone. Until the reading of data "zone0-D1" to "zone0-D3" is completed, the next readable data is data associated with zone 0 that is the flush target zone. The data/zone allocation control unit 22 thus controls the output selector 211E to connect the output port 211B to the external output and disable the loopback path 211C. After that, the data/zone allocation control unit 22 reads data "zone0-D1," data "zone0-D2" and data "zone0-D3" from the FIFO buffer 211.

FIG. 8C is a diagram illustrating a third process of the overtaking process according to the embodiment.

After data "zone0-D1" to "zone0-D3" are read, the next data readable from the FIFO buffer 211 is not data of the flush target zone until data "zone2-D1" to "zone2-D3" are not read from the FIFO buffer 211. The data/zone allocation control unit 22 thus enables the loopback path 211C by controlling the output selector 211E to connect the output port 211B to the loopback path 211C.

In a state in which the loopback path 211C is enabled, the data/zone allocation control unit 22 performs a read operation of reading data from the FIFO buffer 211 and a write operation of writing data to the FIFO buffer 211. Thus, an operation of reading data "zone2-D1" to "zone2-D3" from the output port 211B of the FIFO buffer 211 and an operation of writing the read data "zone2-D1" to "zone2-D3" back to the FIFO buffer 211 via the loopback path 211C and the input port 211A are performed in parallel. As a result, data "zone2-D1" to "zone2-D3" are maintained in the FIFO buffer 211.

FIG. 8D is a diagram illustrating a fourth process of the overtaking process according to the embodiment.

After data "zone2-D1" to "zone2-D3" are read, the next data readable from the FIFO buffer 211 is data of the flush target zone.

Since the next data readable from the FIFO buffer 211 is data of the flush target zone, the data/zone allocation control unit 22 controls the output selector 211E to disable the loopback path 211C and connect the output port 211B to the external output. Then, the data/zone allocation control unit 22 controls the FIFO buffer 211 to read data "zone0-D4" to "zone0-D5" from the output port 211B of the FIFO buffer 211.

Figure 8E:
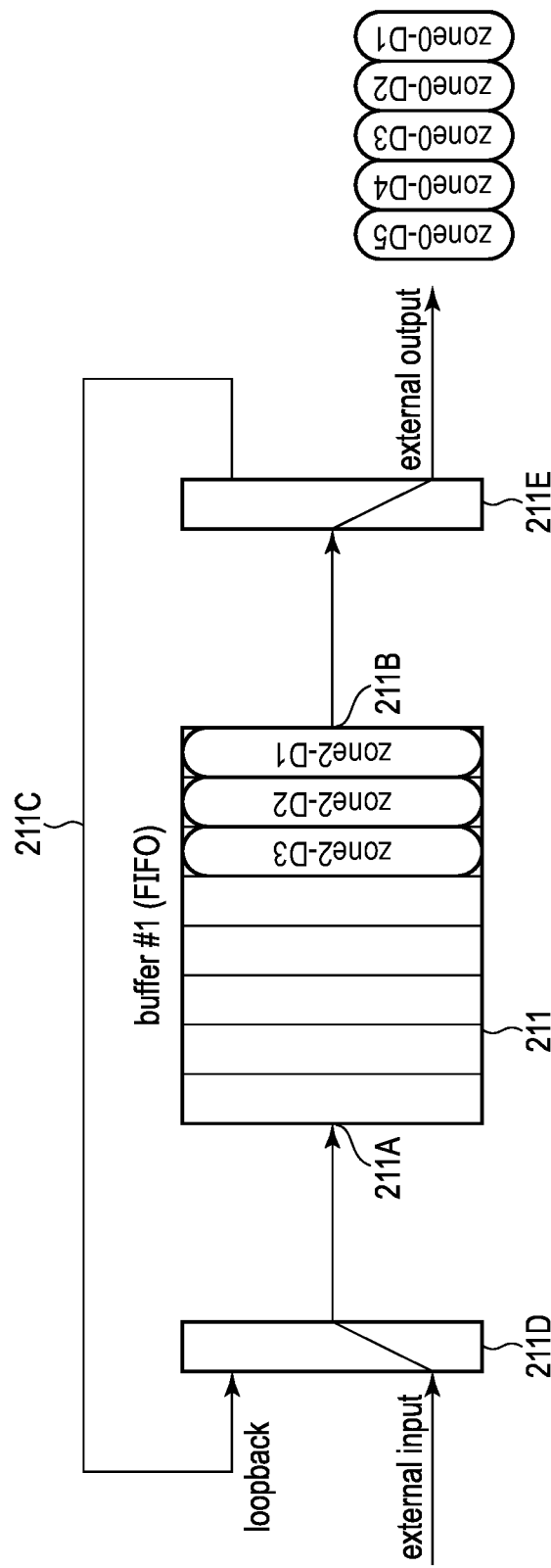
FIG. 8E is a diagram illustrating a fifth process of the overtaking process performed in the memory system according to the embodiment.

FIG. 8E is a diagram illustrating a fifth process of the overtaking process according to the embodiment.

The data/zone allocation control unit 22 confirms that no data of the flush target zone remains in the FIFO buffer 211. When it is found that no data of the flush target zone remains in the FIFO buffer 211, the data/zone allocation control unit 22 controls the input selector 211D to connect the input port 211A to the external input. Thus, the FIFO buffer 211 can receive new data from the external input.

In the overtaking process described above, the data/zone allocation control unit 22 extracts only the data of the flush target zone from buffer #1. Data associated with a zone other than the flush target zone remains stored in buffer #1.

The overtaking process to be performed when a certain buffer becomes full has been described so far. Even when the total size of data of a specific zone stored in a certain buffer is equal to or larger than the write unit, the overtaking process of extracting only data of the specific zone is performed by the same procedure.

Figure 9:
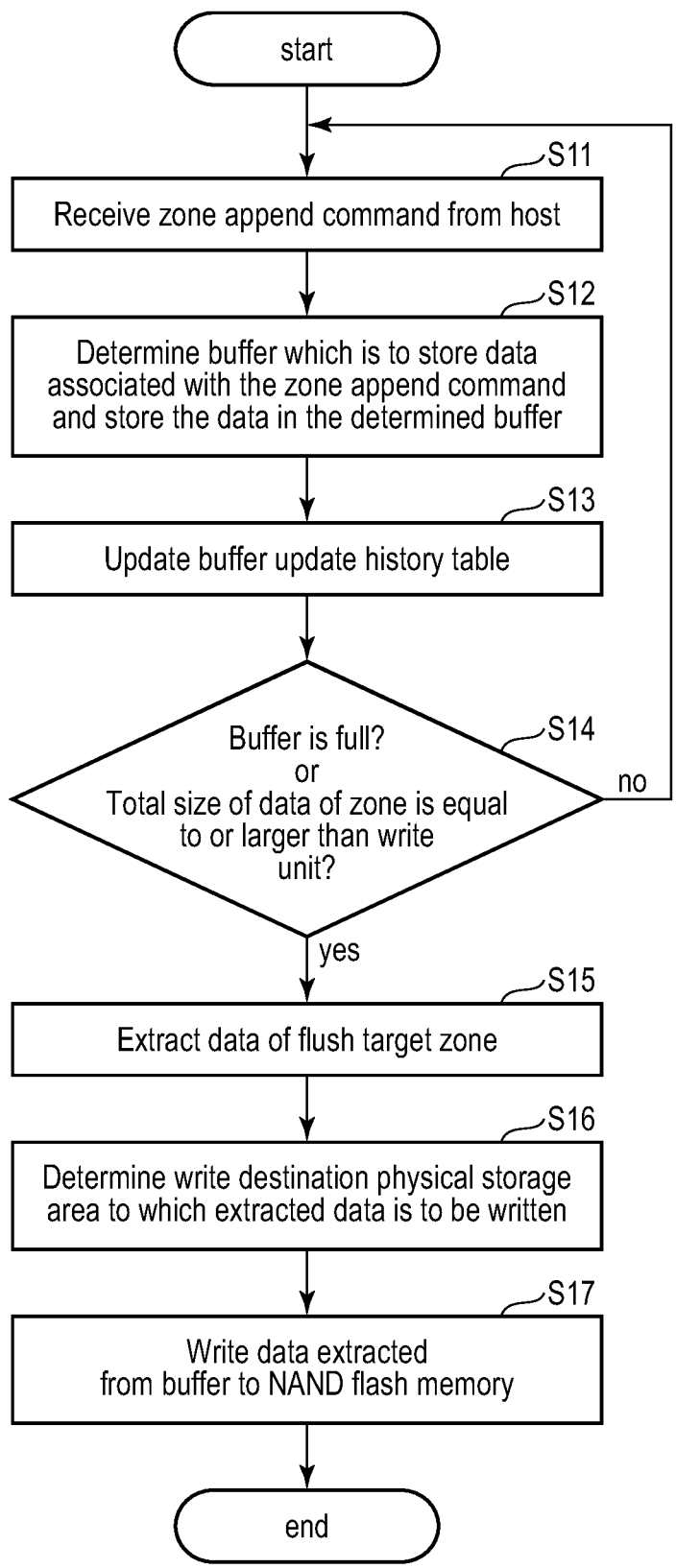
FIG. 9 is a flowchart illustrating a procedure for a command process performed in the memory system according to the embodiment.

FIG. 9 is a flowchart illustrating a procedure for a command process performed in the SSD 3 according to the embodiment.

The command process is a process of executing commands to write data sequentially to any one of a plurality of zones of a zoned namespace. Each of the command may be a zone append command or a write command used as an address specific write command. Hereinafter, a procedure for the command process will be described by exemplifying a process for the zone append command.

First, the controller 4 receives a zone append command from the host 2 (step S11). The controller 4 determines a storage destination buffer which is to store data associated with the received zone append command using the data/buffer allocation control unit 21, and stores the data in the determined storage destination buffer (step S12). A procedure for a data/buffer allocation process to be performed by the data/buffer allocation control unit 21 will be described in detail with reference to FIG. 10.

The controller 4 updates the buffer update history table 32 (step S13). In step S13, the controller 4 adds an identifier of the storage destination buffer determined in step S12 to the buffer update history table 32 as information indicating the buffer that is last updated for storing data. If the identifier to be added to the buffer update history table 32 is the same as that of the buffer added last to the buffer update history table, a process of adding the identifier of the buffer to the buffer update history table 32 may be omitted.

The controller 4 determines whether a certain buffer is full or whether the total size of data of a certain zone in a certain buffer is equal to or larger than the write unit (step S14). That is, the controller 4 determines whether there is a buffer that satisfies the flush start condition.

When there is no buffer in a full state or there is no buffer in which the total size of data of a certain zone is equal to or larger than the write unit (no in step S14), the controller 4 waits until it receives the next zone append command from the host 2.

When there is a buffer in a full state or there is a buffer in which the total size of data of a certain zone is equal to or larger than the write unit (yes in step S14), the controller 4 performs the overtaking process to extract only data of the flush target zone from all data stored in the buffer (step S15). If the buffer is full, the controller 4 determines a zone having the largest total size of associated data as a flush target zone. When there is a buffer in which the total size of data associated with a certain zone is equal to or larger than the write unit, the controller 4 determines the zone as the flush target zone. A procedure for the overtaking process will be described in detail with reference to FIG. 11.

The controller 4 uses the data/zone allocation control unit 22 to determine a write destination physical storage area to which the data extracted in step S15 is to be written (step S16). The write destination physical storage area is a specific storage area in the NAND flash memory 5 allocated to the determined flush target zone.

After that, the controller 4 writes the data of the flush target zone extracted from the buffer to the write destination physical storage area, that is, to a specific storage area (physical storage area) in the NAND flash memory 5 allocated to the flush target zone (step S17).

When the data of the flush target zone is written to the specific storage area in the NAND flash memory 5, the process for one or more zone append commands corresponding to the written data is completed. In step S17, the controller 4 may transmit a command completion corresponding to each of the completed zone append commands to the host 2. Note that the controller 4 need not always wait for the data to be written to the NAND flash memory 5 in step S17 before the transmission of the command completion. It is necessary to wait for the data to be written to the NAND flash memory 5 before the transmission of the command completion only when the Force Unit Access (FUA) included in the received zone append command is set to 1. When the FUA included in the received zone append command is 0, the controller 4 can transmit a command completion corresponding to the received zone append command to the host 2 without waiting for data associated with the received zone append command to be written to the NAND flash memory 5. For example, when data associated with the received zone append command is stored in a buffer, the controller 4 may transmit a command completion corresponding to the received zone append command to the host 2. Each command completion includes information indicating a write destination location (e.g., LBA) in a zone to which data associated with a zone append command corresponding to the command completion is written.

FIG. 10 is a flowchart illustrating a procedure for the data/buffer allocation process according to the embodiment. The data/buffer allocation process described below is the details of the process in step S12 in FIG. 9.

As described with reference to step S11 in FIG. 9, the controller 4 receives a zone append command from the host 2.

The data/buffer allocation control unit 21 refers to an allocation management table provided in each of the buffers to determine whether there is a buffer to which a zone specified by the zone append command received in step S11 is already allocated (step S21).

When there is no buffer to which a zone specified by the received zone append command is already allocated (no in step S21), the data/buffer allocation control unit 21 refers to an allocation management table provided in each of the buffers to determine whether there is a free buffer (step S22).

When there is no free buffer (no in step S22), the data/buffer allocation control unit 21 determines a buffer of which the last update for storing data is the oldest as a storage destination buffer (step S23). The data/buffer allocation control unit 21 refers to the buffer update history table 32 to determine a buffer of which the last update for storing data is the oldest. The storage destination buffer is a buffer which is to store data associated with the received zone append command.

The data/buffer allocation control unit 21 allocates the zone specified by the zone append command received in step S11 to the storage destination buffer (step S24). In step S24, the data/buffer allocation control unit 21 additionally allocates the zone to the storage destination buffer by adding an identifier indicating the zone specified by the zone append command to the allocation management table provided in the storage destination buffer.

The controller 4 stores the data associated with the zone append command received in step S11 in the determined storage destination buffer (step S28). That is, the data/buffer allocation control unit 21 acquires the data associated with the zone append command received in step S11 from the memory 102 of the host 2, and stores the acquired data in the determined storage destination buffer. After that, the process proceeds to step S13 described with reference to FIG. 9. In step S13, the controller 4 updates the buffer update history table 32.

If there are one or more free buffers (yes in step S22), the data/buffer allocation control unit 21 selects any one buffer from the free buffers and determines it as a storage destination buffer (step S25).

The data/buffer allocation control unit 21 allocates the zone specified by the zone append command received in step S11 to the storage destination buffer (step S26).

After that, the process proceeds to step S28. In step S28, the controller 4 stores the data associated with the zone append command received in step S11 in the determined storage destination buffer.

If there is a buffer to which the zone specified by the zone append command received in step S11 is already allocated (yes in step S21), the data/buffer allocation control unit 21 determines the buffer as a storage destination buffer (step S27).

After that, the process proceeds to step S28. In step S28, the controller 4 stores the data associated with the zone append command received in step S11 in the determined storage destination buffer.

Figure 11:
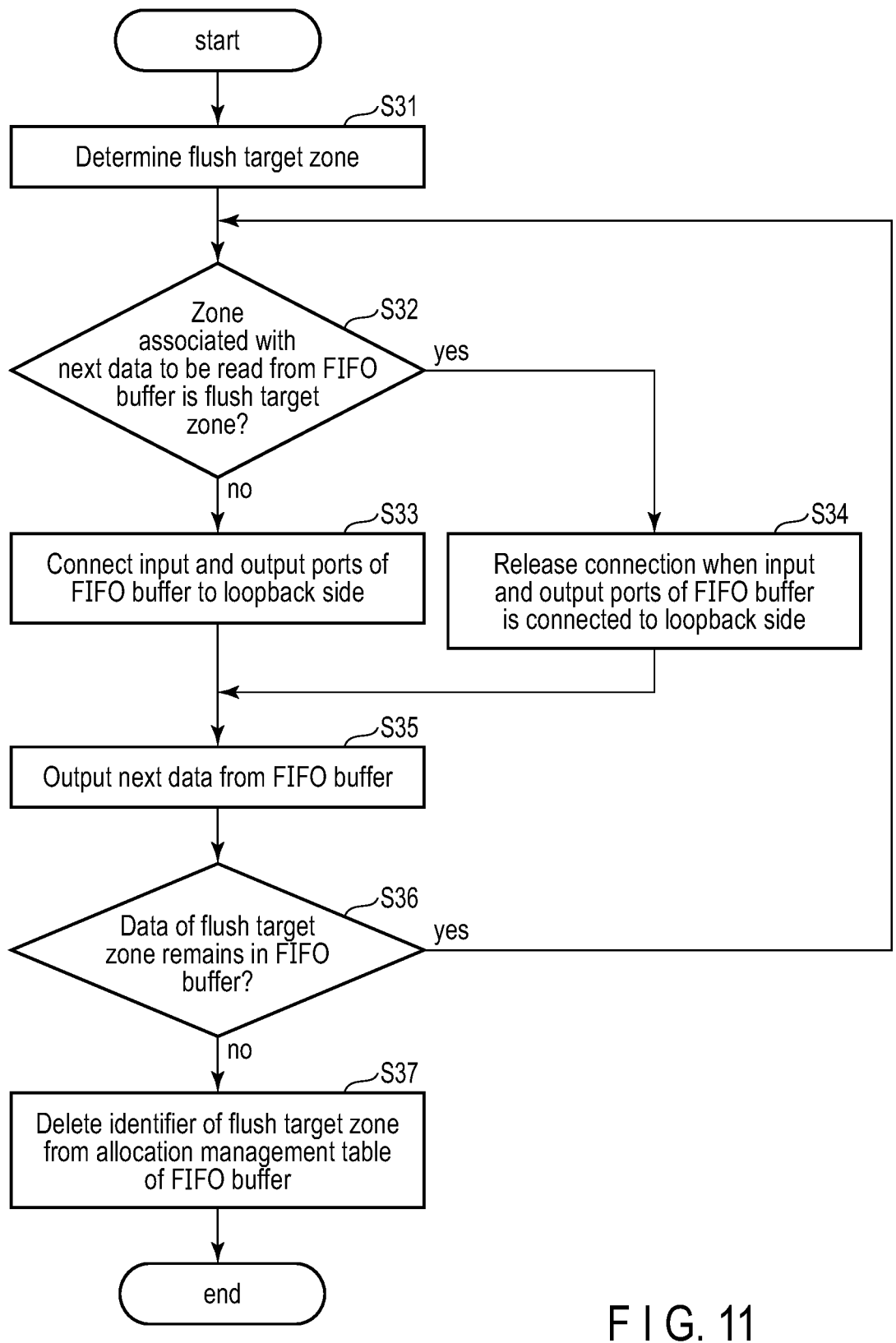
FIG. 11 is a flowchart illustrating a procedure for the overtaking process performed in the memory system according to the embodiment.

FIG. 11 is a flowchart illustrating a procedure for the overtaking process according to the embodiment. Below is a detailed description of the process of step S15 in FIG. 9.

When a buffer (FIFO buffer) satisfies the flush start condition, the data/zone allocation control unit 22 determines a flush target zone from the zones allocated to the FIFO buffer (step S31).

The data/zone allocation control unit 22 determines whether a zone associated with the next data to be read from the FIFO buffer that satisfies the flush start condition (that is, the next readable data in the FIFO buffer) is a flush target zone (step S32).

When the zone associated with the next readable data is not a flush target zone (no in step S32), the data/zone allocation control unit 22 performs control to enable the loopback path of the FIFO buffer and connect the input and output ports of the FIFO buffer to the loopback side (step S33).

When the zone associated with the next readable data is a flush target zone (yes in step S32), if the input and output ports of the FIFO buffer are connected to the loopback side, the data/zone allocation control unit 22 performs control to release the connection (step S34).

The data/zone allocation control unit 22 reads the next data readable from the FIFO buffer (step S35). The data/zone allocation control unit 22 determines whether data of the flush target zone remains in the data stored in the FIFO buffer (step S36).

When the data of the flush target zone remains in the data stored in the FIFO buffer (yes in step S36), the process of the data/zone allocation control unit 22 returns to step S32 to read the next readable data.

When the data of the flush target zone does not remain in the data stored in the FIFO buffer (no in step S36), the data/zone allocation control unit 22 deletes an identifier indicating the flush target zone from the allocation management table of the FIFO buffer (step S37). Thus, the allocation of the flush target zone to the FIFO buffer is canceled.

As described above, according to the present embodiment, when there is a buffer to which a zone specified by the received zone append command is allocated, the controller 4 determines the buffer as a storage destination buffer in which data associated with the received zone append command is to be stored. When there is no buffer to which the zone specified by the received zone append command is allocated but there are one or more free buffers, the controller 4 determines any buffer of the free buffers as a storage destination buffer. When there is no buffer to which the zone specified by the received zone append command is allocated and when there is no free buffer, the controller 4 determines a buffer of which the last update for storing data is the oldest as a storage destination buffer.

The foregoing processes enable data to be distributed to a plurality of buffers without biasing data to a specific buffer. They also enable data which are to be written to the same zone to be stored in the same buffer.

In addition, the controller 4 selects, as a flush target zone, a zone which stores data of the total size equal to or larger than the write unit in any one of the buffers or a zone which stores corresponding data of the largest total size among all zones which store corresponding data in the full-state buffer. Since, therefore, a zone with a relatively large amount of data stored in the buffer can be selected as a flush target zone, the efficiency of sequential writing can be improved in comparison with the case of writing data of each zone in small units to the NAND flash memory 5.

The controller 4 also extracts only the data of the flush target zone while maintaining data of a zone other than the flush target zone in a buffer. Thus, even when fragmentation in which data of the same zone is distributed to different locations in one buffer is caused, a flush process can be performed only for the data of the flush target zone without performing a flush process for data of a zone other than the flush target zone. Therefore, only the data of the flush target zone having a relatively large amount can be written to the NAND flash memory 5 without writing the data in the buffer to the NAND flash memory 5 in small units.

As described above, in the present embodiment, data to be written to different zones can efficiently be buffered using a smaller number of buffers than the number of zones included in the zoned namespace. Furthermore, in the present embodiment, only the data of the flush target zone can be written to the NAND flash memory 5 from a buffer in which data of different zones are mixed. Thus, the number of memory resources in the SSD 3 required to control a plurality of zones can be reduced in comparison with the configuration using the same number of buffers as the number of zones.

Upon receiving a write command used as an address specific write command from the host 2, the controller 4 may transmit the completion of the write command to the host 2 when data associated with the write command is stored in a buffer.

Thus, the host 2 can issue the next write command specifying the same zone as specified by the write command, to the SSD 3. As a result, before processing of a write command specifying a certain zone is actually completed, that is, before writing of data associated with the write command to the NAND flash memory 5 is completed, the next write command specifying the same zone can be received from the host 2. Therefore, even when each write command requires writing of data of a small size, a write process can be started after a fixed amount of data associated with the same zone is accumulated in the same buffer, with the result that the efficiency of writing to the NAND flash memory 5 can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a nonvolatile memory; and
   a controller electrically connected to the nonvolatile memory and configured to control the nonvolatile memory using a zoned namespace defined by a standard of NVM express, the zoned namespace being divided into a plurality of zones, wherein
   the controller is configured to:
   manage a plurality of buffers, the number of the plurality of buffers being smaller than the number of the plurality of zones; and
   in response to receiving from a host a first command for writing data sequentially to a first zone among the plurality of zones, the first command being associated with first data,
      when the plurality of buffers include a first buffer to which the first zone is allocated, store the first data in the first buffer;
      when the plurality of buffers do not include the first buffer but include a free buffer to which no zone is allocated, allocate the first zone to a second buffer that is the free buffer and store the first data in the second buffer to which the first zone is allocated; and
      when the plurality of buffers include neither the first buffer nor a free buffer to which no zone is allocated, additionally allocate the first zone to a third buffer of which last update for storing data is the oldest among the plurality of buffers, and store the first data in the third buffer to which the first zone is additionally allocated.

2. The memory system of claim 1, wherein the controller is further configured to:
   manage history information indicating an order in which the plurality of buffers are updated for storing data; and
   when the plurality of buffers include neither the first buffer nor a free buffer to which no zone is allocated, determine the third buffer of which the last update for storing data is the oldest among the plurality of buffer by referring to the history information.

3. The memory system of claim 1, wherein
the controller is further configured to:
when a fourth buffer of the plurality of buffers stores second data associated with a second zone among the plurality of zones and third data associated with a third zone among the plurality of zones, the third zone being different from the second zone, and when a size of the second data is equal to or larger than a write unit for the nonvolatile memory,
extract the second data from the fourth buffer while maintaining the third data in the second buffer; and
write the extracted second data to a storage area in the nonvolatile memory that is allocated to the second zone.

4. The memory system of claim 3, wherein
the controller is further configured to:
when a fifth buffer of the plurality of buffers is in a full-state and stores fourth data associated with a fourth zone among the plurality of zones and fifth data associated with a fifth zone among the plurality of zones, the fifth zone being different from the fourth zone, and when a size of the fourth data is larger than a size of the fifth data,
extract the fourth data from the fifth buffer while maintaining the fifth data in the fifth buffer; and
write the extracted fourth data to a storage area in the nonvolatile memory that is allocated to the fourth zone.

5. The memory system of claim 3, wherein
each of the plurality of buffers includes a first-in first-out buffer, an input port for inputting data to the first-in first-out buffer, an output port for outputting data from the first-in first-out buffer, and a path for connecting the output port to the input port, and
the controller is further configured to:
when next data readable from the first-in first-out buffer of the fourth buffer is the third data, enable the path and perform an operation of reading the third data from the first-in first-out buffer of the fourth buffer and an operation of writing the read third data back to the first-in first-out buffer of the fourth buffer to maintain the third data in the fourth buffer.

6. The memory system of claim 5, wherein
the controller is further configured to:
when the next data readable from the first-in first-out buffer of the fourth buffer is the second data, disable the path and perform an operation of reading the second data from the first-in first-out buffer of the fourth buffer to extract the second data from the fourth buffer.

7. The memory system of claim 3, wherein
the nonvolatile memory includes a plurality of blocks, each of the plurality of blocks including a plurality of pages, each of the plurality of blocks being a unit for a data erase operation, each of the plurality of pages being a unit for a data write operation and a data read operation, and
the write unit for the nonvolatile memory is a multiple of size of each of the plurality of pages or a multiple of size of each of the plurality of blocks.

8. The memory system of claim 1, wherein
the first command is a zone append command defined in the standard of NVM express.

9. The memory system of claim 1, wherein
the first command is a write command defined as an address specific write command in the standard of NVM express.

10. The memory system of claim 1, wherein
an interface between the memory system and the host conforms to a PCI express bus or a network.

11. A method of controlling a nonvolatile memory using a zoned namespace defined by a standard of NVM express, the zoned namespace being divided into a plurality of zones, the method comprising:
managing a plurality of buffers, the number of the plurality of buffers being smaller than the number of the plurality of zones;
receiving from a host a first command for writing data sequentially to a first zone among the plurality of zones, the first command being associated with first data;
when the plurality of buffers include a first buffer to which the first zone is allocated, storing the first data in the first buffer;
when the plurality of buffers do not include the first buffer but include a free buffer to which no zone is allocated, allocating the first zone to a second buffer that is the free buffer and storing the first data in the second buffer to which the first zone is allocated; and
when the plurality of buffers include neither the first buffer nor a free buffer to which no zone is allocated, additionally allocating the first zone to a third buffer of which last update for storing data is the oldest among the plurality of buffers, and storing the first data in the third buffer to which the first zone is additionally allocated.

12. The method of claim 11, further comprising:
managing history information indicating an order in which the plurality of buffers are updated for storing data; and
when the plurality of buffers include neither the first buffer nor a free buffer to which no zone is allocated, determining the third buffer of which the last update for storing data is the oldest among the plurality of buffer by referring to the history information.

13. The method of claim 11, further comprising:
when a fourth buffer of the plurality of buffers stores second data associated with a second zone among the plurality of zones and third data associated with a third zone among the plurality of zones, the third zone being different from the second zone, and when a size of the second data is equal to or larger than a write unit for the nonvolatile memory,
extracting the second data from the fourth buffer while maintaining the third data in the second buffer; and
writing the extracted second data to a storage area in the nonvolatile memory that is allocated to the second zone.

14. The method of claim 13, further comprising:
when a fifth buffer of the plurality of buffers is in a full-state and stores fourth data associated with a fourth zone among the plurality of zones and fifth data associated with a fifth zone among the plurality of zones, the fifth zone being different from the fourth zone, and when a size of the fourth data is larger than a size of the fifth data,
extracting the fourth data from the fifth buffer while maintaining the fifth data in the fifth buffer; and
writing the extracted fourth data to a storage area in the nonvolatile memory that is allocated to the fourth zone.

15. The method of claim 13, wherein
each of the plurality of buffers includes a first-in first-out buffer, an input port for inputting data to the first-in first-out buffer, an output port for outputting data from the first-in first-out buffer, and a path for connecting the output port to the input port, and the method further comprises:

when next data readable from the first-in first-out buffer of the fourth buffer is the third data, enabling the path and performing an operation of reading the third data from the first-in first-out buffer of the fourth buffer and an operation of writing the read third data back to the first-in first-out buffer of the fourth buffer to maintain the third data in the fourth buffer.

16. The method of claim 15, further comprising:

when the next data readable from the first-in first-out buffer of the fourth buffer is the second data, disabling the path and performing an operation of reading the second data from the first-in first-out buffer of the fourth buffer to extract the second data from the fourth buffer.

17. The method of claim 13, wherein the nonvolatile memory includes a plurality of blocks, each of the plurality of blocks including a plurality of pages, each of the plurality of blocks being a unit for a data erase operation, each of the plurality of pages being a unit for a data write operation and a data read operation, and the write unit for the nonvolatile memory is a multiple of size of each of the plurality of pages or a multiple of size of each of the plurality of blocks.

18. The method of claim 11, wherein the first command is a zone append command defined in the standard of NVM express.

19. The method of claim 11, wherein the first command is a write command defined as an address specific write command in the standard of NVM express.

20. The method of claim 11, further comprising:

communicating with the host by using an interface that conforms to a PCI express bus or a network.

* * * * *